United States Patent
Cheng et al.

(10) Patent No.: US 10,929,879 B2
(45) Date of Patent: Feb. 23, 2021

(54) METHOD AND APPARATUS FOR IDENTIFICATION OF FRAUDULENT CLICK ACTIVITY

(71) Applicant: TENCENT TECHNOLOGY (SHENZHEN) COMPANY LIMITED, Shenzhen (CN)

(72) Inventors: Quan Cheng, Shenzhen (CN); Yiqun Li, Shenzhen (CN); Chunhui Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 358 days.

(21) Appl. No.: 15/971,614

(22) Filed: May 4, 2018

(65) Prior Publication Data

US 2018/0253755 A1 Sep. 6, 2018

Related U.S. Application Data

(63) Continuation of application No. PCT/CN2017/085687, filed on May 24, 2017.

(30) Foreign Application Priority Data

May 24, 2016 (CN) .......................... 201610349338.7

(51) Int. Cl.
*G06Q 30/00* (2012.01)
*G06Q 30/02* (2012.01)
(Continued)

(52) U.S. Cl.
CPC ......... *G06Q 30/0248* (2013.01); *G06F 15/76* (2013.01); *G06K 9/6259* (2013.01);
(Continued)

(58) Field of Classification Search
CPC ...................... H04L 29/06877; G06Q 30/0248
See application file for complete search history.

(56) References Cited

U.S. PATENT DOCUMENTS 8,245,282 B1 * 8/2012 Buckwalter ............ G06Q 10/10
726/4
8,533,825 B1 * 9/2013 Marsa ................. H04L 63/1425
726/22

(Continued)

FOREIGN PATENT DOCUMENTS

CN 103150369 A 6/2013
CN 103310003 A 9/2013
(Continued)

OTHER PUBLICATIONS

Metwally, Ahmed et al. "Using Association Rules for Fraud Detection in Web Advertising Networks" Department of Computer Science, University of California, 2005. (Year: 2005).*
(Continued)

*Primary Examiner* — Michael Bekerman
(74) *Attorney, Agent, or Firm* — Oblon, McClelland, Maier & Neustadt, L.L.P.

(57) ABSTRACT

This application discloses a method and an apparatus for advertisement fraud reduction. A training sample set including multiple training samples is obtained. At least one of the multiple training samples, associated with a fraudulent training user, includes a training click log associated with clicking one or more advertisements by the fraudulent training user. Feature information from the training sample set is extracted. The fraudulent training user and the feature information are associated with a fraudulent user type. A positive sample associated with the feature information is formed based on the at least one of the multiple training samples. A fraudulent user identification model associated with the fraudulent user type is trained based on at least the positive
(Continued)

sample. Further, a sample to be identified, associated with a user to be identified, is received. Whether the user is a fraudulent user is determining using the fraudulent user identification model.

19 Claims, 10 Drawing Sheets

(51) Int. Cl.
G06N 20/00 (2019.01)
G06F 15/76 (2006.01)
G06K 9/62 (2006.01)

(52) U.S. Cl.
CPC ............ *G06N 20/00* (2019.01); *G06Q 30/02* (2013.01); *G06Q 30/0277* (2013.01)

(56) References Cited

U.S. PATENT DOCUMENTS

| | | | | |
|---|---|---|---|---|
| 9,027,127 | B1* | 5/2015 | Soldo | H04L 63/1425 705/14.2 |
| 10,387,911 | B1* | 8/2019 | Shaw | G06Q 30/0248 |
| 2004/0153365 | A1* | 8/2004 | Schneider | G06Q 30/0225 705/14.19 |
| 2007/0061211 | A1* | 3/2007 | Ramer | G06Q 20/12 705/25 |
| 2007/0073579 | A1* | 3/2007 | Immorlica | G06Q 30/0248 705/14.47 |
| 2007/0255821 | A1* | 11/2007 | Ge | G06Q 10/00 709/224 |
| 2008/0147456 | A1* | 6/2008 | Broder | G06Q 30/0248 705/14.47 |
| 2008/0162200 | A1* | 7/2008 | O'Sullivan | G06Q 30/04 705/34 |
| 2008/0162202 | A1* | 7/2008 | Khanna | G06Q 30/0248 705/14.47 |
| 2008/0270154 | A1* | 10/2008 | Klots | G06Q 30/0241 705/14.4 |
| 2009/0157417 | A1* | 6/2009 | Bradley | G06Q 30/0185 705/318 |
| 2009/0299967 | A1* | 12/2009 | Li | G06Q 30/02 |
| 2011/0131652 | A1* | 6/2011 | Robinson | H04L 63/1408 726/22 |
| 2011/0208714 | A1* | 8/2011 | Soukal | G06F 16/951 707/709 |
| 2011/0296009 | A1* | 12/2011 | Baranov | G06Q 30/0248 709/224 |
| 2013/0117081 | A1* | 5/2013 | Wilkins | G06Q 30/0248 705/14.4 |
| 2014/0244572 | A1* | 8/2014 | Hill | G06F 16/958 707/603 |
| 2015/0205955 | A1* | 7/2015 | Turgeman | G06Q 30/0248 726/7 |
| 2016/0328742 | A1* | 11/2016 | Shiravi Khozani | G06Q 30/0248 |
| 2016/0350800 | A1* | 12/2016 | Qiu | G06Q 30/0248 |
| 2018/0034850 | A1* | 2/2018 | Turgeman | G06Q 30/0248 |

FOREIGN PATENT DOCUMENTS

| | | | |
|---|---|---|---|
| CN | 103390027 | A | 11/2013 |
| CN | 105046529 | A | 11/2015 |
| CN | 105404947 | A | 3/2016 |
| CN | 106022834 | A | 10/2016 |
| JP | 2002-245339 | | 8/2002 |
| JP | 2007-286803 | | 1/2007 |
| WO | WO-2008030670 | A1 * | 3/2008 ............. G06Q 30/02 |

OTHER PUBLICATIONS

Karasaridis, Anestis et al. "Wide-scale Botnet Detection and Characterization", http://www.usenix.org/event/hotbots07/tech/full_papers/karasaridis/karasaridis.pdf, Apr. 2007. (Year: 2007).*
Gu, Guofei. "Correlation-Based Botnet Detection in Enterprise Networks". http://smartech.gatech.edu/dspace/bitstream/1853/24634/1/gu_guofei_200808_phd.pdf. Aug. 2008. (Year: 2008).*
Daswani, Neil et al. "The Anatomy of Clickbot.A". http://www.usenix.org/event/hotbots07/tech/full_papers/daswani/daswani.pdf. In HotBots'07: Proceedings of the first conference on First Workshop on Hot Topics in Understanding Botnets, 2007. (Year: 2007).*
Majumdar, Saugat et al. "Addressing Click Fraud in Content Delivery Systems", http://www.ieeexplore.ieee.org/ xpls/abs_all.jsp?arnumber=4215618, In Proceedings of the 26th IEEE Infocom International Conference on Computer Communications, 2007. (Year: 2007).*
Zhang, Linfeng et al. "Detecting Click Fraud in Pay-Per-Click Streams of Online Advertising Networks", http://www.ieeexplore.ieee.org/xpls/abs_all.jsp?arnumber=4595871,The 28th International Conference on Distributed Computing Systems, 2008. (Year: 2008).*
Saad, Sherif et al. "Detecting P2P botnets through network behavior analysis and machine learning". 2011 Ninth Annual International Conference on Privacy, Security and Trust. Jul. 2011. (Year: 2011).*
Karim A, Salleh R, Khan MK (2016) SMARTbot: A Behavioral Analysis Framework Augmented with Machine Learning to Identify Mobile Botnet Applications. PLoS One 11(3): e0150077. Mar. 15, 2016. (Year: 2016).*
Privad: Rearchitecting Online Advertising for Privacy, Technical Report: MPI-SWS-2009-004, Guha et al., Max Planck Institute for Software Systems, Oct. 2, 2009, pp. 1-30. (Year: 2009).*
Serving Ads from localhost for Performance, Privacy, and Profit, Guha et al., accessed on Feb. 22, 2011, http://adresearch.mpi-sws.org/privad-workshop.pdf (Year: 2011).*
Japanese Office Action dated Apr. 23, 2019 in Japanese Patent Application 2018-543423 with English Translation.
International Preliminary Report on Patentability dated Nov. 27, 2018 in Application No. PCT/CN2017/085687.
Written Opinion dated Sep. 1, 2017 in International Application No. PCT/CN2017/085687 with English Translation.
International Search Report dated Sep. 1, 2017 in Patent Application No. PCT/CN2017/085687, with English translation, citing documents AO-AR therein, 6 pages.
Chinese Office Action dated Oct. 10, 2019 in Chinese Patent Application No. 201610349338.7 with English concise explanation of relevance.

* cited by examiner

METHOD AND APPARATUS FOR IDENTIFICATION OF FRAUDULENT CLICK ACTIVITY

RELATED APPLICATION

This application is a continuation of International Application No. PCT/CN2017/085687, filed on May 24, 2017, which claims priority to Chinese Patent Application No. 201610349338.7, filed with the Chinese Patent Office on May 24, 2016. The entire disclosures of the prior applications are hereby incorporated by reference in their entirety.

FIELD OF THE TECHNOLOGY

This application relates to Internet technologies.

BACKGROUND OF THE DISCLOSURE

Currently, advertisers need to push advertisements to users, to propagate products or services. As the quantity of Internet users, especially mobile Internet users, rapidly increases, Internet advertising becomes a new form in which advertisements are placed, and a placement volume of the Internet advertising is also increasing rapidly.

In an Internet advertising ecosystem, based on users, a traffic party provides various forms of Internet-based services (for example, providing news, media play, and an online game), and places an advertisement in a service (for example, an application (APP) used by the user or a web page accessed by the user) used by a user in a process of using the service. If the user clicks the advertisement, the quantity of clicks (also referred to as advertisement traffic) on the advertisement is increased. It can be learned that, the traffic party consumes the quantity of clicks on the advertisement based on an advertisement resource (for example, an advertisement in the APP or an advertisement position in the web page) owned by the traffic party.

The Internet advertising system has the following problems:

To increase the quantity of clicks by a user on an advertisement that is placed on an owned advertisement resource, to obtain more income, the traffic party may click the advertisement placed on the advertisement resource in a fraudulent manner, forming a false quantity of clicks on the advertisement (also referred to as false advertisement flow). However, in related technologies, there is still no effective solution to accurately identify a fraudulent user and filter the false quantity of clicks from the quantity of clicks on the advertisement.

SUMMARY

Embodiments of this application provide a method and an apparatus for reducing advertisement-related fraud, to identify a fraudulent user making advertisement-related fraud in the Internet.

Aspects of the disclosure provide a method. A training sample set including multiple training samples is obtained. At least one of the multiple training samples is associated with a fraudulent training user and includes a training click log associated with clicking one or more advertisements by the fraudulent training user. In addition, feature information from the training sample set is extracted. The fraudulent training user and the feature information are associated with a fraudulent user type. A positive sample associated with the feature information is formed based on the at least one of the multiple training samples. A fraudulent user identification model associated with the fraudulent user type is trained based on at least the positive sample. Further, a sample to be identified is received. The sample is associated with a user to be identified. Whether the user to be identified is a fraudulent user is determined based on the sample to be identified by using the fraudulent user identification model associated with the fraudulent user type.

Aspects of the disclosure provide an apparatus. The apparatus includes interface circuitry and processing circuitry. The interface circuitry obtains a training sample set including multiple training samples. At least one of the multiple training samples is associated with a fraudulent training user and includes a training click log associated with clicking one or more advertisements by the fraudulent training user. The interface circuitry also receives a sample to be identified. The sample is associated with a user to be identified. The processing circuitry extracts feature information from the training sample set. The fraudulent training user and the feature information are associated with a fraudulent user type. The processing circuitry forms, based on the at least one of the multiple training samples, a positive sample associated with the feature information. The processing circuitry trains, based on at least the positive sample, a fraudulent user identification model associated with the fraudulent user type. Further, the processing circuitry determines, by using the fraudulent user identification model associated with the fraudulent user type, whether the user to be identified is a fraudulent user based on the sample to be identified.

Aspects of the disclosure provide a non-transitory computer-readable storage medium storing a program executable by a processor. A training sample set including multiple training samples is obtained. At least one of the multiple training samples is associated with a fraudulent training user and includes a training click log associated with clicking one or more advertisements by the fraudulent training user. In addition, feature information from the training sample set is extracted. The fraudulent training user and the feature information are associated with a fraudulent user type. A positive sample associated with the feature information is formed based on the at least one of the multiple training samples. A fraudulent user identification model associated with the fraudulent user type is trained based on at least the positive sample. Further, a sample to be identified is received. The sample is associated with a user to be identified. Whether the user to be identified is a fraudulent user is determined based on the sample to be identified by using the fraudulent user identification model associated with the fraudulent user type.

In the embodiments of this application, based on the different levels of the fraudulent users to be identified, a corresponding feature is extracted from the samples to train a corresponding level fraudulent user identification model, thereby performing targeted identification on the different levels of fraudulent users by using the trained model.

BRIEF DESCRIPTION OF THE DRAWINGS

FIG. 1-2 is a schematic architectural diagram of an apparatus for preventing advertisement-related fraud according to an embodiment of this application;

FIG. 2 is a schematic implementation diagram of identifying a low level fraudulent user by an apparatus for preventing advertisement-related fraud according to an embodiment of this application;

FIG. 3-1 is a schematic flowchart of identifying a middle level fraudulent user according to an embodiment of this application;

FIG. 3-2 is a schematic flowchart of identifying a middle level fraudulent user according to an embodiment of this application;

DESCRIPTION OF EMBODIMENTS

Figure 1:
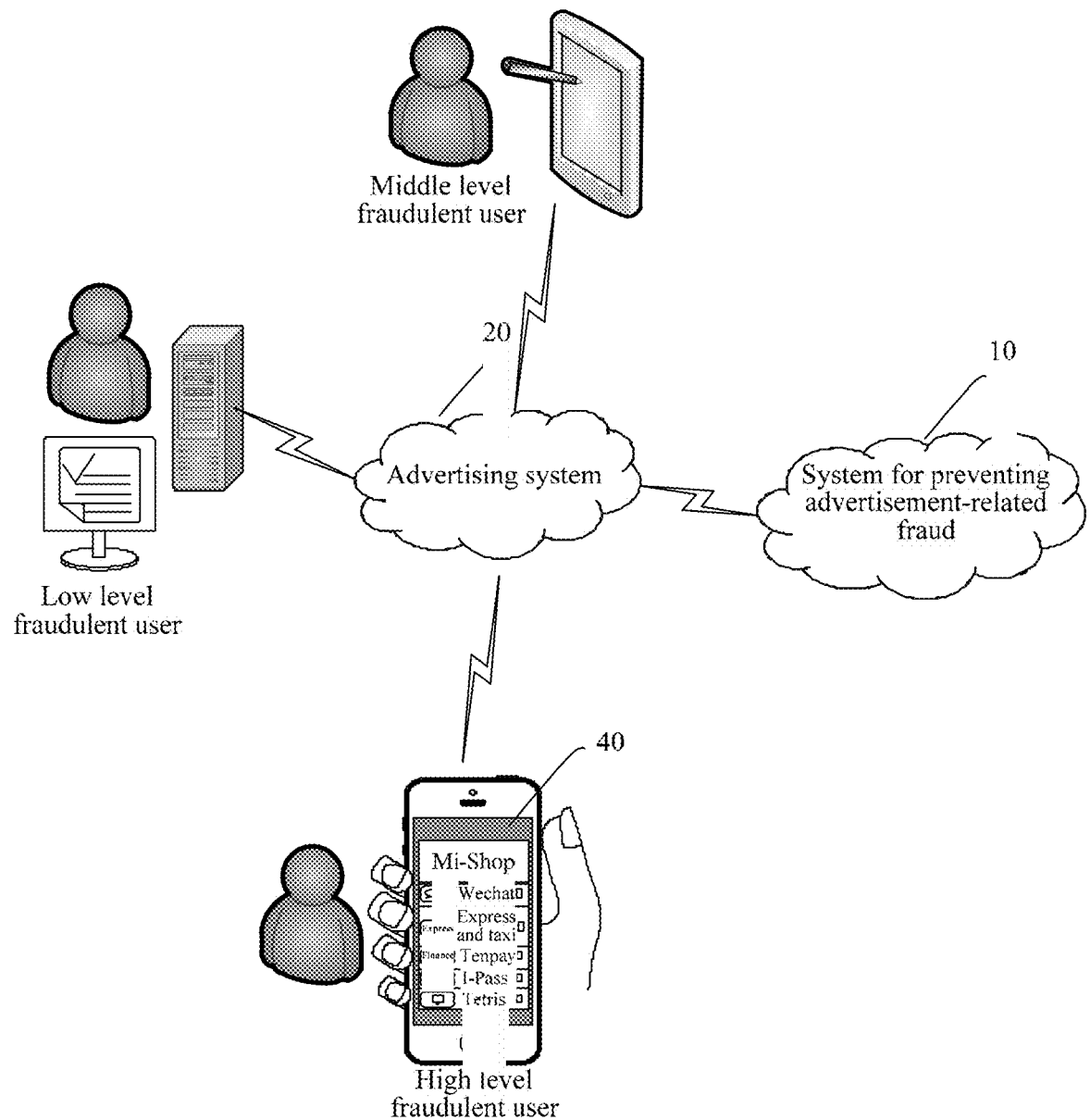
FIG. 1-1 is a schematic architectural diagram of an apparatus for preventing advertisement-related fraud according to an embodiment of this application.

The following further describes this application in detail with reference to the accompanying drawings and embodiments. It should be understood that the embodiments described herein are merely used to explain this application but are not intended to limit this application. In addition, the embodiments described below are used for implementing some embodiments of this application instead of implementing all embodiments of this application. Both embodiments obtained by persons of ordinary skills in the art by recombining the technical solutions of the embodiments and all other embodiments implemented based on this application fall within the protection scope of this application.

It should be noted that, in the embodiments of this application, the terms "include", "comprise", and any variants thereof are intended to cover a non-exclusive inclusion. Therefore, a method or an apparatus that includes a series of elements not only includes such elements described clearly, but also includes other elements not listed expressly, or may include inherent elements for implementing the method or apparatus. Unless otherwise specified, an element limited by "include a/an . . . " does not exclude other relevant elements (for example, a step in the method or a unit in the apparatus) existing in the method or apparatus that includes the element.

The nouns and terms involved in the embodiments of this application are explained as follows.

Advertisement exposure: An advertisement is presented at an advertisement position (for example, an advertisement position in a page accessed by a user or an advertisement position in an APP used by a user) of a user side. When the advertisement is presented once on the user side, this situation is referred to as one time of advertisement exposure.

Advertisement clicking: The user accesses a page of an advertiser by clicking an advertisement on a terminal (for example, a smartphone or a tablet computer). The user clicks the advertisement once to access the page of the advertiser, which is referred to as the advertisement clicking.

Advertisement effect: After the advertisement is exposed, the user clicks the advertisement, and places an order to buy a commodity or downloads an APP from the page of the advertiser, which is referred to as the advertisement effect.

Click rate: It is a ratio of the quantity of clicks on the advertisement to the quantity of times of the advertisement exposure.

Internet mercenaries: They are network personnel who are employed by a network company and achieve an objective such as gaining profit or creating a public opinion by using a means such as clicking the advertisement, downloading the APP, or posting. In the embodiments of this application, they are also referred to as fraudulent users.

Advertisement-related fraud: In the links, such as the advertisement exposure, the advertisement click, and the advertisement effect, due to a malicious objective, the user may implement a behavior to increase the quantity of times of the advertisement exposure or the quantity of clicks on the advertisement or improve the advertisement effect. The malicious behavior of such fraudulent user is referred to as advertisement-related fraud.

Preventing advertisement-related fraud: Checking is performed on the links, such as the advertisement exposure, the advertisement click, and the advertisement effect, to determine whether the advertisement exposure, the advertisement click, the advertisement effect or the like is triggered by means of normal access on the user side or implemented by the fraudulent user by using a fraudulent means for the advertisement.

System for preventing advertisement-related fraud: It is a system for anti-fraud checking on the links, such as the advertisement exposure, the advertisement click, and the advertisement effect.

Policy for preventing advertisement-related fraud: It includes a series of rules used by the system for preventing advertisement-related fraud to combat fraudulent behaviors. Each type of rules is referred to as a policy.

Advertising task platform: It is a platform providing a paid task, such as advertisement browsing, the advertisement clicking, or downloading the APP. A user of the platform obtains a reward point by completing the paid task, to redeem money or a prize. The behavior of clicking the advertisement by the user of the platform is similar to the behavior of clicking the advertisement by the fraudulent user.

High (first) level fraudulent user: It is a professional fraudulent user group, and thoroughly knows the system for preventing fraud. A group of high level fraudulent users click a batch of APPs together. An APP used by a high level fraudulent user is a false APP with an enclosure, and is specifically designed for the high level fraudulent user to make advertisement-related fraud, to ensure that a behavior of a single fraudulent user is the same as a behavior of a normal user. It is usually a user group faked by fraudulent software.

Middle (second) level fraudulent user: It is a professional fraudulent user, knows something about the system for preventing fraud, and dispersedly and intermittently clicks the advertisement in a long period of time. It is usually a user of the advertising task platform or an occupational Internet mercenary.

Low (third) level fraudulent user: It is an unorganized fraudulent user, knows little about the system for preventing fraud, and clicks a large quantity of advertisements in a short period of time. It is usually internal or peripheral personnel of a traffic party.

In an Internet advertising ecosystem, to obtain a higher click rate and income, some traffic parties enables internal personnel thereof, employs Internet mercenaries, or induce users, to click advertisements on the traffic thereof in a short or long period of time. A system for preventing fraud (which is described by using an example in which an apparatus for preventing fraud is implemented as the system for preventing fraud in the embodiments of this application) needs to identify a fraudulent user and filter the quantity of clicks of the fraudulent user on an advertisement.

A system for preventing fraud provided in the related technology can identify certain advertisement-related fraud behavior for making fraud. However, as fraudulent means of fraudulent users are changed and improved, some deeply hidden fraudulent users are difficult to be identified.

For this case, the embodiments of this application provide a method for preventing advertisement-related fraud and an apparatus for preventing advertisement-related fraud apply the method for preventing advertisement-related fraud. The apparatus for preventing advertisement-related fraud may be implemented in various manners. The following describes implementations of the apparatus for preventing advertisement-related fraud.

In an example, referring to FIG. 1-1, FIG. 1-1 is a schematic architectural diagram of an apparatus for preventing advertisement-related fraud according to an embodiment of the disclosure. The apparatus for preventing advertisement-related fraud is implemented as a system for preventing advertisement-related fraud (which may be implemented in a form of a server or a server cluster in an actual application, optionally, to provide a service for preventing advertisement-related fraud in a form of cloud service), and the system for preventing advertisement-related fraud is connected to an advertising system. The following describes the advertising system.

The advertising system pushes an advertisement to an advertisement position of a terminal of a corresponding user according to a targeting condition (for example, information such as an age, a region, a group, or a consumption capacity of an advertisement audience) that is specified by an advertiser for pushing the advertisement, and correspondingly forms a click log for each statistical period (for example, one week) according to clicks of the user on the advertisement. The click log is used for recording various types of information about the clicks of the user on the advertisement, for example, the quantity of clicks and click time.

In addition, for each statistical period, the advertising system further forms an exposure log by collecting statistics. In an example, the exposure log includes an object exposed by the advertisement clicked by the user, for example, an APP or a commodity.

In addition, for each statistical period, the advertising system further forms an effect log corresponding to each APP by collecting statistics. In an example, the effect log includes an effect that is achieved for the exposed object of the advertisement after the user clicks the advertisement.

In addition, for each statistical period, the advertising system correspondingly collects statistics on information of a device used by the user for clicking the advertisement, for example, hardware information and software information of the device.

The system for preventing advertisement-related fraud obtains the click log of a click of the user on the advertisement, the effect log, the exposure log, and device information of the user from the advertising system, and performs processing based on at least one type of the information, to form models for identifying different levels of fraudulent users, thereby identifying the different levels of fraudulent users by using the different models; and may further filter the quantity of clicks of the fraudulent users on the advertisement, to ensure the accuracy of a statistical quantity of clicks on the advertisement of a user side.

Figures 1, 2:
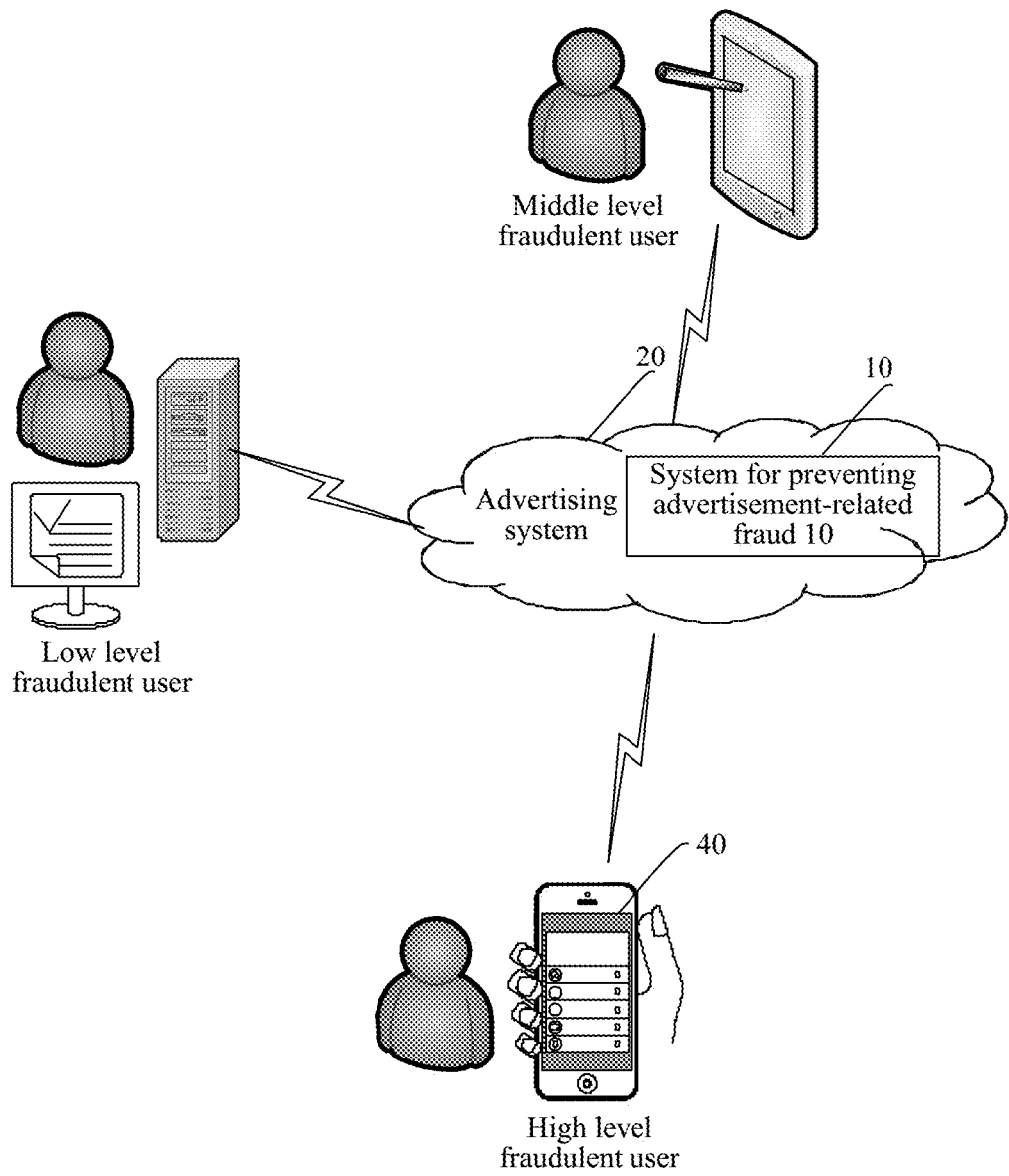
Figure 2:
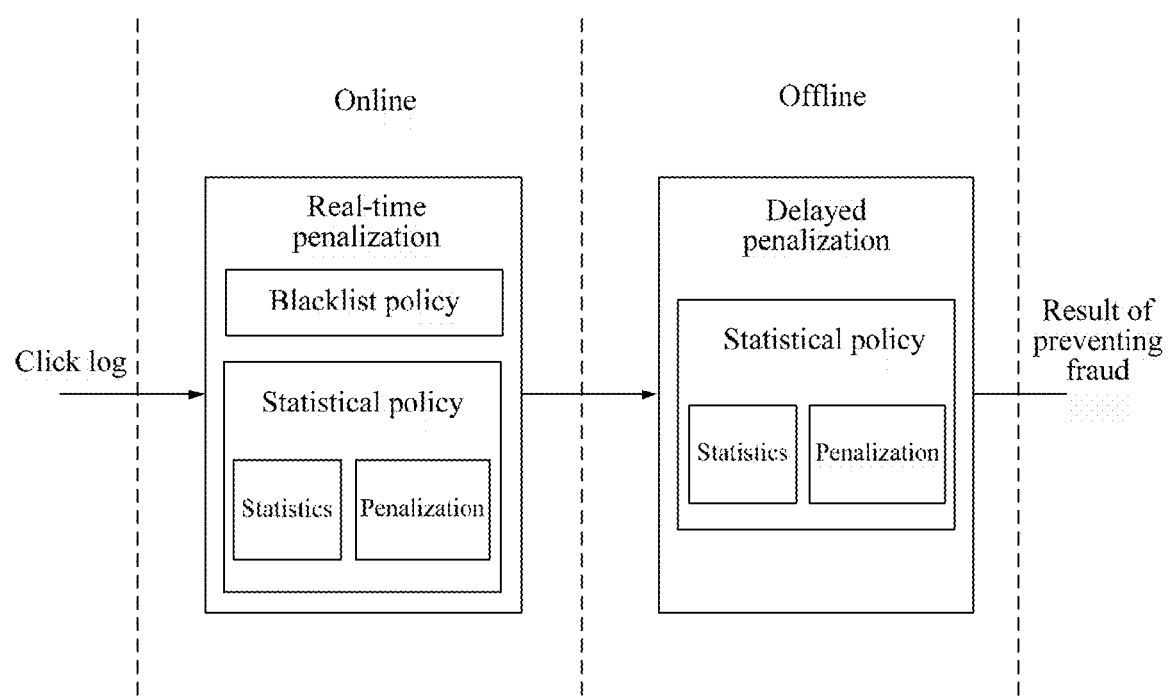

In another example, referring to FIG. 1-2, the apparatus for preventing advertisement-related fraud is used as a functional module and coupled into the system for preventing advertisement-related fraud shown in FIG. 1-1. The apparatus for preventing advertisement-related fraud obtains the click log of the click of the user on the advertisement, the effect log, the exposure log, and device information of the user from the advertising system, and performs processing based on at least one type of the information, to form models for identifying different levels of fraudulent users, thereby identifying the different levels of fraudulent users by using the different models; and may further filter the quantity of clicks of the fraudulent users on the advertisement, to ensure the accuracy of a statistical quantity of clicks on the advertisement of a user side.

Note that, an optional architecture of the apparatus for preventing advertisement-related fraud that is shown in FIG. 1-1 and FIG. 1-2 is merely schematic, and in an actual application, the architecture may be easily changed according to the processing apparatus for preventing advertisement-related fraud that is shown in FIG. 1-1 and FIG. 1-2, to be implemented in a different manner.

With reference to FIG. 1-1, the following describes identification of a low level fraudulent user, a middle level fraudulent user, and a high level fraudulent user by the system for preventing advertisement-related fraud. For identification of a low level fraudulent user, a middle level fraudulent user, and a high level fraudulent user by the system for preventing advertisement-related fraud based on the apparatus for preventing advertisement-related fraud that is shown in FIG. 1-2, the identification may be implemented by reference to the following descriptions.

1. Identification of a Low Level Fraudulent User

In some embodiments, referring to FIG. 2, FIG. 2 is a schematic implementation diagram of identifying a low level fraudulent user by an apparatus for preventing advertisement-related fraud according to an embodiment of the disclosure. Identification of the low level fraudulent user is processed by means of online real-time penalization and offline delayed repenalization. In an example, the processing manner of the online real-time penalization includes a blacklist policy and a statistical policy, and the processing manner of the offline delayed repenalization includes a statistical strategy. Descriptions are separately provided below.

1) Online Real-Time Penalization 1.1) Blacklist Policy

In an example of the real-time penalization, the system for preventing advertisement-related fraud maintain a blacklist including a low level fraudulent user in advance, in which the blacklist includes an identifier of the low level fraudulent user. The system for preventing advertisement-related fraud extracts an identifier of a user who currently clicks the advertisement from the click log obtained from the advertising system, matches the identifier with the identifier of the low level fraudulent user in the blacklist, and if the matching succeeds, determine that the user who currently clicks the advertisement is the low level fraudulent user.

In an example, the identifier of the low level fraudulent user uses information for distinguishing a unique user, for example, a phone number or social platform account (for example, a WeChat account or a QQ account) of the user. Certainly, the identifier of the low level fraudulent user is not only limited to such type, or may use any type of identifier, such as an Internet Protocol (IP) address or a media access control (MAC) address. Optionally, to ensure the accuracy of identifying the low level fraudulent user, two or more type of the identifiers may be combined to calibrate the low level fraudulent user.

1.2) Statistical Strategy

In another example of the online real-time penalization, according to the click log obtained from the advertising system, the system for preventing advertisement-related fraud collects statistics on the quantity of clicks of the user on the advertisement in a statistical period (for example, five minutes or one hour, which is specified according to a situation in an actual application), and when the quantity of clicks on the advertisement exceeds a threshold for the quantity of clicks, identifies the user as the low level fraudulent user. The system for preventing advertisement-related fraud filters (penalizes) the quantity of clicks of the low level fraudulent user and gives feedback to the advertising system, to avoid a problem that the quantity of clicks used by the advertising system is inaccurate due to the quantity of clicks of the low level fraudulent user.

In an example of filtering the quantity of clicks of the low level fraudulent user, the quantity of clicks exceeding the threshold for the quantity of clicks is filtered according to a preset ratio. A higher quantity of clicks exceeding the threshold for the quantity of clicks indicates a higher filtering ratio.

For example, if the quantity of clicks is a, and the threshold for the quantity of clicks is b, when a is greater than b, the quantity of clicks exceeding the threshold for the quantity of clicks (a-b) is filtered by selecting a filtering ratio according to a corresponding relationship between a value space of (a-b) and the filtering ratio. An example of the corresponding relationship between the value space of (a-b) and the filtering ratio is shown in Table 1.

TABLE 1

|  | (a − b) | |
| --- | --- | --- |
|  | 1000 | 2000 |
| Filtering ratio | 50% | 80% |

It is learned from Table 1 that, a higher quantity of clicks exceeding the threshold for the quantity of clicks indicates a higher corresponding filtering ratio, to furthest reduce the quantity of clicks of the low level fraudulent user from the quantity of clicks on the advertisement.

2) Offline Delayed Repenalization

In some embodiments, to further reduce the quantity of clicks of the low level fraudulent user from the quantity of clicks on the advertisement, the system for preventing advertisement-related fraud further uses the delayed repenalization.

In an example, according to the click log obtained from the advertising system, the system for preventing advertisement-related fraud collects statistics on the quantity of clicks of the user on the advertisement in a statistical period (for example, a set time interval is five minutes or one hour, which is specified according to a situation in an actual application), and when the quantity of clicks on the advertisement exceeds the threshold for the quantity of clicks, identifies the user as the low level fraudulent user. The quantity of clicks that is in the quantity of clicks of the low level fraudulent user and that does not exceed the threshold for the quantity of clicks is filtered according to a preset ratio, or all clicks are filtered, that is, the quantity of clicks of the low level fraudulent user is zeroed out.

In addition, the preset ratio used in the offline delayed repenalization may be a fixed ratio, or may be dynamically determined (for example, proportional) according to the quantity of clicks of the user in the statistical period. The preset ratio for each low level fraudulent user is dynamically determined according to a positively correlated (for example, proportional) relationship between the quantity of clicks of the user in the statistical period and the preset ratio. That is, a higher quantity of clicks of the user in the statistical period indicates a higher preset ratio for filtering the quantity of clicks that is in the quantity of clicks of the user and that does not exceed the threshold for the quantity of clicks.

If the filtering is started after the quantity of clicks in one hour exceeds 20 times, the delayed repenalization is to filter the quantity of clicks of the first 20 times that does not exceed the threshold, and do not process the quantity of clicks exceeding the threshold for the quantity of clicks. Meanwhile, a ratio for filtering the quantity of clicks of the first 20 times that does not exceed the threshold (20) for the quantity of clicks is determined based on the quantity of clicks of the user in one hour. If the quantity of clicks of a user A in one hour is 21, when the quantity of clicks of the user B in one hour is 100, a ratio for filtering the first 20 times is less than a ratio for filtering the first 20 times of a user B.

For example, if the quantity of clicks of the user is a, and the threshold for the quantity of clicks is b, when a is greater than b, the quantity of clicks that is in the quantity a of clicks and that does not exceed the quantity of clicks, that is the quantity b of clicks, is filtered according to the preset ratio (for example, 70%). The quantity of clicks of the user is b*(1-70%). Alternatively, the quantity b of clicks is completely zeroed out, the quantity b of clicks that is in the quantity of clicks of the user and that does not exceed the threshold for the quantity of clicks is zeroed out.

With reference to the real-time penalization and delayed repenalization for the low level fraudulent user that are shown in FIG. 2, the real-time penalization (filtering according to a ratio) is implemented for the quantity of clicks that is in the quantity of clicks of the low level fraudulent user and that exceeds the threshold for the quantity of clicks, and the delayed repenalization (filtering according to a fixed preset ratio or a preset ratio that is dynamically adjusted) is implemented for the quantity of clicks that is in the quantity of clicks of the low level fraudulent user and that does not exceed the threshold for the quantity of clicks, to furthest reducing the quantity of clicks of the low level fraudulent user from the quantity of clicks on the advertisement, ensure the accuracy and reliability of the quantity of clicks on the advertisement that is finally obtained by the advertising system by collecting statistics, and also guarantee to generate accurate charging data for the advertisement pushed by an advertiser.

2. Identification of a Middle Level Fraudulent User

Figures 1, 3:
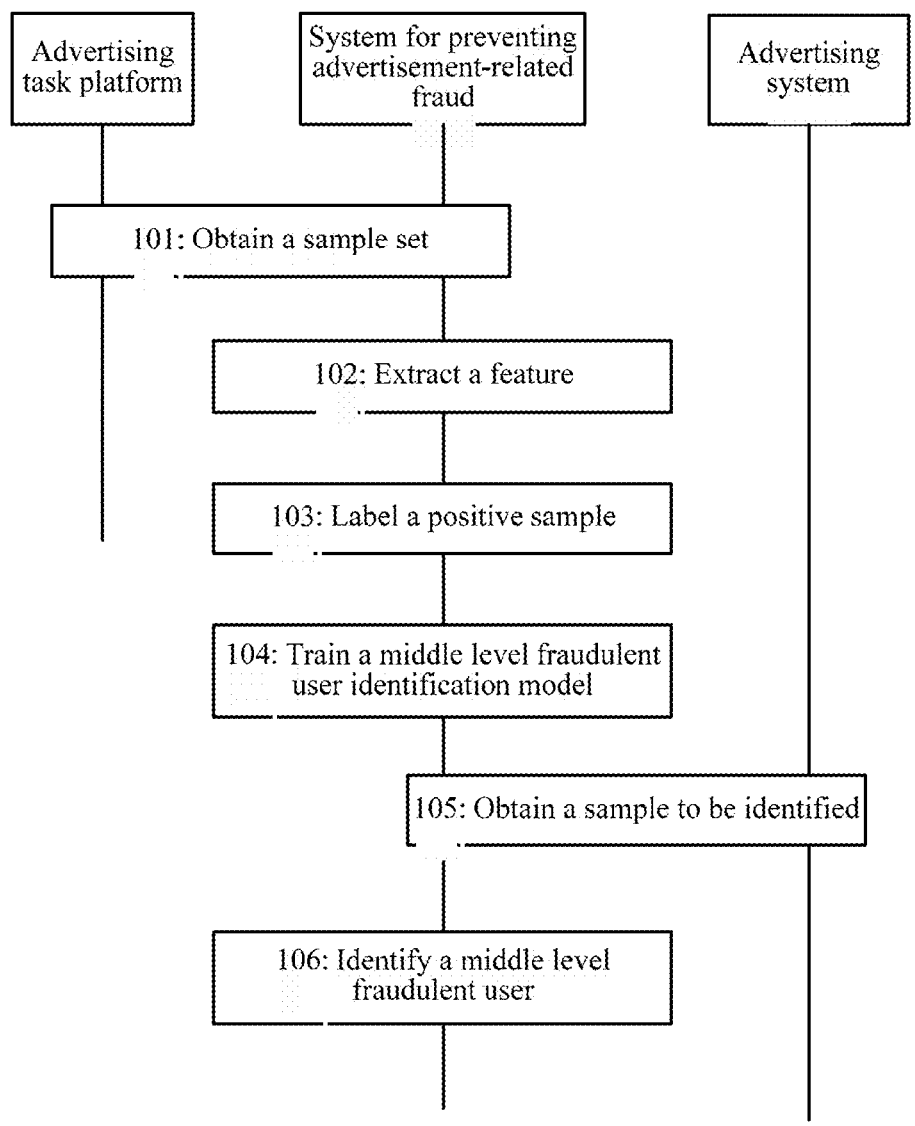
Figures 2, 3:
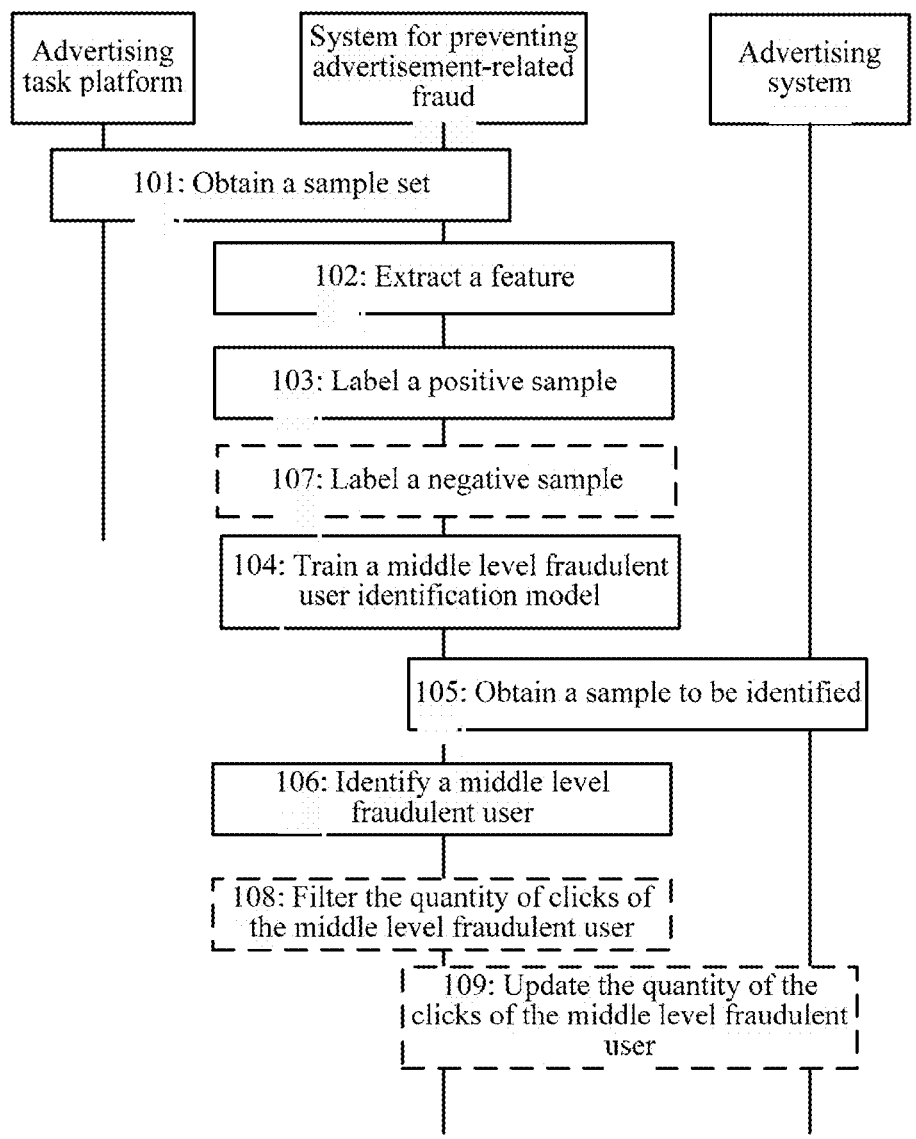

Referring to FIG. 3-1, FIG. 3-1 is an optional schematic flowchart of identifying a middle level fraudulent user according to an embodiment of this application. The process includes step 101 to step 106, and each step is described as follows.

In this embodiment of this application, an apparatus for preventing advertisement-related fraud uses a middle level fraudulent user identification model to identify a middle level fraudulent user from users. Therefore, a system for preventing advertisement-related fraud needs to form an available sample to train the middle level fraudulent user identification model, so that the identification precision of the middle level fraudulent user identification model reaches a preset available precision.

In some embodiments, the system for preventing advertisement-related fraud obtains a sample set (step 101) from an advertising task platform, to form samples for training the middle level fraudulent user identification model. The sample set includes a sample corresponding to the middle level fraudulent user. An optional data structure in the sample is shown in Table 2:

TABLE 2

| Sample | User identifier | Click log |
| --- | --- | --- |
| Sample 1 | Middle level fraudulent user 1 | Click log 1 |
| Sample 2 | Middle level fraudulent user 2 | Click log 2 |

Referring to Table 2, a sample in the sample set includes at least one middle level fraudulent user and a click log of the middle level fraudulent user in a statistical period (for example, one week). In an example, the click log includes operating data of clicks of the middle level fraudulent user on an advertisement, for example, an ID of each click on the advertisement or click time.

In an actual application, because a behavior of a user of the advertising task platform is most similar to a click behavior of the middle level fraudulent user, the platform user who is in the advertising task platform and who completes an advertising task is considered as the middle level fraudulent user. Correspondingly, a click log corresponding to the platform user who obtains the advertising task from the advertising task platform and who completes the advertising task forms the sample set.

Subsequently, obtaining of the sample set by the system for preventing advertisement-related fraud is described. The sample corresponding to the middle level fraudulent user is used for forming a positive sample by the system for preventing advertisement-related fraud, to train the middle level fraudulent user identification model. To further increase the precision of identifying the middle level fraudulent user by the middle level fraudulent user identification model, in some other embodiments, a sample set obtained by the system for preventing advertisement-related fraud further includes a sample corresponding to a non-fraudulent user, which is used for forming a negative sample by the system for preventing advertisement-related fraud, to train the middle level fraudulent user identification model. In an example, the sample corresponding to the non-fraudulent user includes a user of a normal APP (that is, an APP in which it is known that no fraudulent user exists), that is, a non-fraudulent user, and a click log corresponding to the click of the user on the advertisement in an advertisement position in a process of using the normal APP. An optional data structure of the sample corresponding to the non-fraudulent user is shown in Table 3:

TABLE 3

| Sample | User identifier | Click log |
| --- | --- | --- |
| Sample 3 | A user 3 of an APP 1 (a normal APP) | A click log 3 of clicks of the user 3 on the advertisement in the APP 1 |
| Sample 4 | A user 4 of the APP 1 | A click log 4 of clicks of the user 4 on the advertisement in the APP 1 |

Table 3 shows the optional data structure of the sample corresponding to the non-fraudulent user. In Table 3, for example, the APP 1 is a normal APP. Both the user 3 and the user 4 install the APP 1 in their terminals, and click an advertisement in an advertisement position of the APP 1. Correspondingly, based on the click logs obtained from an advertising system, the system for preventing advertisement-related fraud forms a sample corresponding to each non-fraudulent user (the user 3 and the user 4) in the APP 1.

Descriptions are provided after the foregoing step. After obtaining the sample set, the system for preventing advertisement-related fraud parses operating data of the clicks of the user on the advertisement that correspond to the click log in the sample set, and extracts a feature associated with operations of the clicks of the user on the advertisement (step 102).

As noted, in some embodiments, when the sample set includes the sample corresponding to the middle level fraudulent user, the system for preventing advertisement-related fraud parses the click log in the sample corresponding to the middle level fraudulent user, to determine a feature associated with operations of clicks of the middle level fraudulent user on the advertisement. In some other embodiments, when the sample set further includes the sample corresponding to the non-fraudulent user, the system for preventing advertisement-related fraud further parses the click log in the sample corresponding to the non-fraudulent user, to determine a feature associated with operations of clicks of the non-fraudulent user on the advertisement.

In some embodiments, the feature associated with the operations of clicks of the user (the middle level fraudulent user or the non-fraudulent user) on the advertisement includes a feature of the at least one dimension.

1) The Quantity of Clicks of the User in the Statistical Period

In an example, the quantity of clicks of the user in the statistical period on the advertisement is a total quantity of clicks of the user on the advertisement in any advertisement position in the statistical period, for example, an advertisement position in a page or an advertisement position in an APP.

For example, the user clicks a total of three advertisements in the statistical period, that is, an advertisement 1, an advertisement 2, and an advertisement 3. Quantities of corresponding clicks are respectively 1, 2, and 3. The quantity of clicks of the user in the statistical period is 6(1+2+3).

Alternatively, the quantity of clicks of the user in the statistical period on the advertisement is a total quantity of clicks of the user on a same advertisement in the statistical period. The user clicks a total of three advertisements in a first time period of the statistical period, that is, an advertisement 1, an advertisement 2, and an advertisement 3. Quantities of corresponding clicks are respectively 1, 2, and 3. The user clicks a total of three advertisements in a second time period of the statistical period, that is, the advertisement 1, the advertisement 2, and the advertisement 3. Quantities of corresponding clicks are respectively 1, 2, and 3. Quantities of clicks of the user that correspond to the advertisement 1, the advertisement 2, and the advertisement 3 in the statistical period are 2(1+1), 4(2+2), and 6(3+3).

2) The Quantity of Time Periods that are in the Statistical Period and in Which the Advertisement is Clicked by the User In an example, the quantity of time periods in which the user clicks the advertisement is the quantity of time periods in which the user clicks the advertisement.

For example, the statistical period is one day, and a time period is one hour. If the user clicks the advertisement in the first hour, second hour, fourth hour, and fifth hour of the one day, the quantity of time periods in which the user clicks the advertisement in the statistical period is 4.

3) An Average of Interval Time Between Clicks of the User on the Advertisement in the Statistical Period For example, the user clicks the advertisement at time T1/T2/T3 in the statistical period, a corresponding average is (T2−T1)/2+(T3−T2)/2.

4) A Historical Ratio of Identified Fraudulent Users to Users in the Statistical Period In any one of current statistical periods, it is a historical ratio of the quantity of identified middle level fraudulent users to the quantity of users clicking the advertisement (including the middle level fraudulent users and non-fraudulent users). Certainly, the historical ratio may alternatively be an average of ratios of multiple statistical periods in the current statistical periods.

5) An Average Quantity of Clicks on the Advertisement in Time Periods That are in the Statistical Period and in Wwhich the Advertisement is Clicked by the User Still using the foregoing example as an example, the statistical period is one day, and a time period is one hour. If the user clicks the advertisement in the first hour, second hour, fourth hour, and fifth hour of the one day, the quantity of time periods in which the user clicks the advertisement in the statistical period is 4, the quantity of clicks in the statistical period is 12(1+2+4+5), and the average quantity of clicks on the advertisement in the four time periods is 3(12/4).

Note that the feature associated with the operation of clicking the advertisement by the user that is applied in this embodiment of this application is not limited to the features. Persons of ordinary skills in the art may easily change or extend the feature associated with the operation of clicking the advertisement by the user, to implement a feature that is different from the feature associated with the operation of clicking the advertisement by the user.

Descriptions are provided after the foregoing step. After extracting the feature of the at least one dimension from the sample corresponding to the middle level fraudulent user, the system for preventing advertisement-related fraud may form the positive sample for training the middle level fraudulent user identification model. In an example, the system for preventing advertisement-related fraud labels the fraudulent user and the click log of the click of the fraudulent user on the advertisement as the positive sample in the feature of the at least one dimension (step 103).

In some embodiments, if the system for preventing advertisement-related fraud also extracts a feature of at least one dimension from the sample corresponding to the non-fraudulent user, the system for preventing advertisement-related fraud may for the negative sample for training the middle level fraudulent user identification model. In an example, referring to FIG. 3-2, FIG. 3-2 is an optional schematic flowchart of identifying a middle level fraudulent user according to an embodiment of this application. The system for preventing advertisement-related fraud labels the non-fraudulent user and the click log of the click of the non-fraudulent user on the advertisement as the negative sample in the feature of the at least one dimension (step 107).

Descriptions are provided after the foregoing step. After forming the positive sample for training the middle level fraudulent user identification model, the system for preventing advertisement-related fraud inputs the positive sample to the middle level fraudulent user identification model, to train model parameters of the middle level fraudulent user identification model (step 104). In some embodiments, if also forming the negative sample for training the middle level fraudulent user identification model, the system for preventing advertisement-related fraud inputs the negative sample together with the positive sample to the middle level fraudulent user identification model to be training, to increase the identification precision of the middle level fraudulent user identification model, and shorten a training process.

The following describes training the middle level fraudulent user identification model by using samples (the positive sample and the negative sample). The middle level fraudulent user identification model may be considered as a mapping that includes a series of functions and that is from the extracted feature of the at least one dimension to an identification result of the user (whether is the middle level fraudulent user). An optional example may be:

$$\text{the identification result} = f(a*\text{feature } 1 + b*\text{feature } 2),$$

in which the feature 1 and the feature 2 are features of samples (one of the positive sample and one of the negative sample) for training, and model parameters a and b are used for controlling weights of the feature 1 and the feature 2. A training process of the middle level fraudulent user identification model is a process in which the model parameters a/b are continuously optimized. In an actual application, the quantity of model parameters may be 2 or more, and the quantity of used features is not limited.

Therefore, in an embodiment, to verify whether the identification precision of the middle level fraudulent user identification model meets a pragmatic need, the system for preventing advertisement-related fraud may test the precision (that is, a correctness percentage) of identifying the fraudulent user of the middle level fraudulent user identification model by using a prior database (including features of the fraudulent user, the non-fraudulent user, and the click log). When the identification precision does not reach a preset precision, the model parameters are adjusted and processed until the precision of the middle level fraudulent user identification model reaches the preset precision.

Descriptions are provided after the foregoing step. After training the middle level fraudulent user identification model, the system for preventing advertisement-related fraud may use the trained middle level fraudulent user identification model to identify the middle level fraudulent user. The system for preventing advertisement-related fraud obtains a sample to be identified from the advertising system (step 105). Refer to Table 2 and Table 3 for a data structure of the sample to be identified, including a user to be identified and a click log of the user to be identified. The system for preventing advertisement-related fraud extracts a feature corresponding to at least one of the features from the sample to be identified, inputs the feature to the trained fraudulent user identification model, and identify the middle level fraudulent user in the sample to be identified based on the identification result (whether is the middle level fraudulent user) of the middle level fraudulent user identification model (step 106).

In some embodiments, referring to FIG. 3-2, after identifying the middle level fraudulent user from the sample to be identified, the system for preventing advertisement-related fraud further filters the quantity of clicks of the middle level fraudulent user (step 108), and updates the filtered quantity of clicks of the middle level fraudulent user to the advertising system (step 109), so that a charging end of the advertising system performs charging for advertisement push by using the updated quantity of clicks in combination with a charging policy. The quantity of clicks of the middle level fraudulent user associated with clicking the advertisement is filtered, thereby ensuring that the quantity of clicks on the advertisement is formed due to normal click operations of the user, ensuring the accuracy and realness of the quantity of clicks on the advertisement, and avoiding a problem that advertisement charging for an advertiser is inaccurate.

In an example, the system for preventing advertisement-related fraud has multiple filtering methods when filtering the quantity of clicks of the middle level fraudulent user. Descriptions are provided below with reference to different filtering methods.

Filtering method 1): The quantity of clicks of the middle level fraudulent user is filtered according to a preset ratio. For example, the quantity of clicks of the middle level fraudulent user is a, and the preset ratio is 70%, the filtered quantity of clicks of the middle level fraudulent user is updated to a*30%. Specially, when the preset ratio is 100%, the quantity of clicks of the middle level fraudulent user is zeroed out.

Filtering method 2): The quantity of clicks that is in the quantity of clicks of the middle level fraudulent user and that does not exceed a threshold for the quantity of clicks is filtered according to a ratio, or the quantity of all clicks is filtered, that is, the quantity of clicks of the middle level fraudulent user is zeroed out. The quantity of clicks that is in the quantity of clicks of the middle level fraudulent user and that exceeds the threshold for the quantity of clicks is filtered according to a preset ratio, and a larger quantity of clicks exceeding the quantity of clicks indicates a larger filtering ratio.

Figure 4:
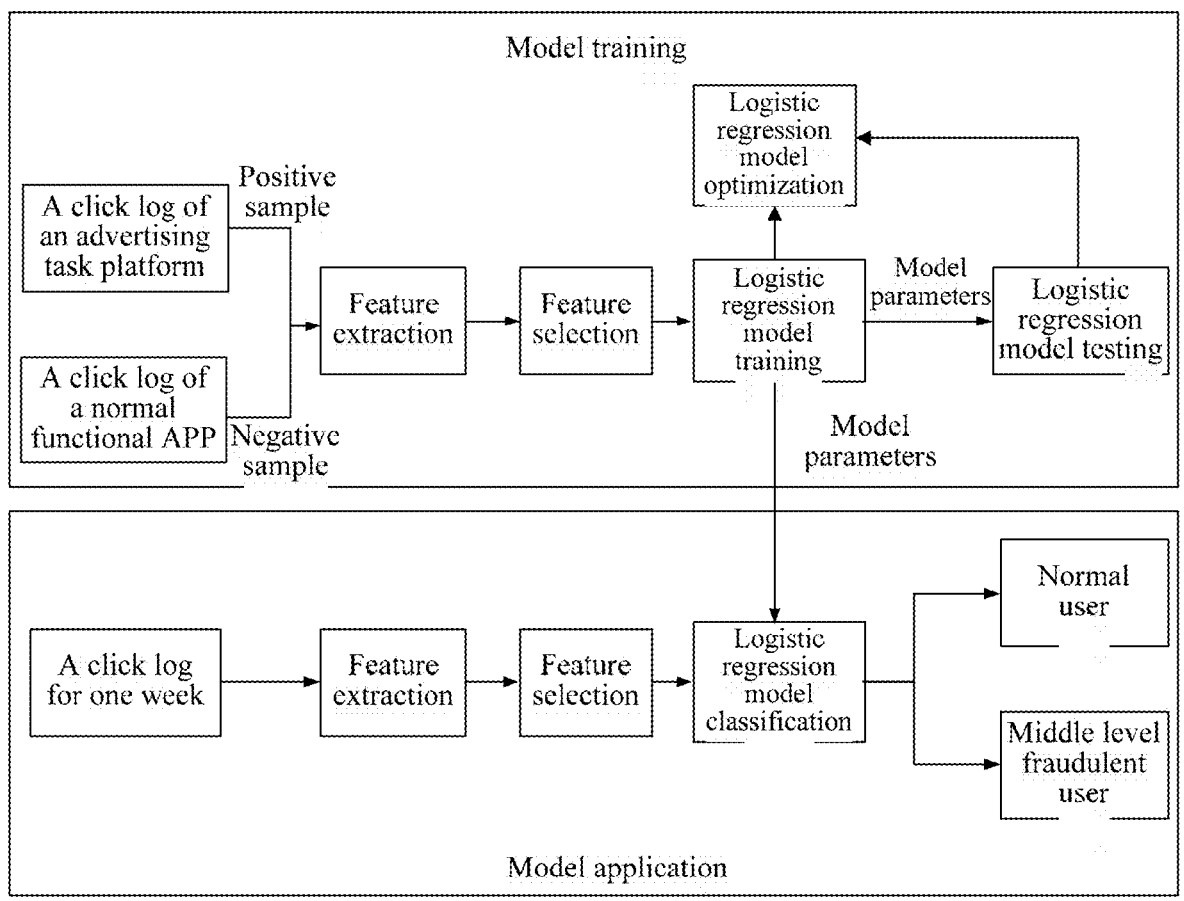
FIG. 4 is a schematic implementation diagram of training a middle level fraudulent user identification model and identifying a middle level fraudulent user by using the middle level fraudulent user identification model according to an embodiment of this application.

Moreover, with reference to FIG. 4, FIG. 4 is an optional schematic diagram of training the middle level fraudulent user identification model and identifying the middle level fraudulent user by using the middle level fraudulent user identification model. Two stages of model training and model usage are included, and are respectively described below.

1) Model Training

A positive sample for training is a click log of the advertising task platform, and a negative sample for training is a click log of a normal function APP (an APP in which it is known that no fraudulent user exists).

The middle level fraudulent user dispersedly and intermittently clicks the advertisement in a long period of time.

For the feature, six features are extracted based on the positive sample and the negative sample: the quantity of clicks in one week, the quantity of days in which the advertisement is clicked and that are in the one week, the quantity of hours in which the advertisement is clicked and that are in the one week, an average time difference between adjacent clicks in the one week, a ratio of fraud that is identified online in the one week, and a ratio of the quantity of clicks in the one week to the quantity of hours in which the advertisement is clicked and that are in the one week. Based on the six features, a logistic regression model is trained to determine whether the user is the middle level fraudulent user.

2) Model Usage

After obtaining model parameters of the logistic regression model by means of training, based on the click log that is of clicks of the user to be identified on the advertisement in one week and that is obtained from the advertising system, a feature of the click log of the user to be identified in the one week is extracted, and the foregoing six features are input to the logistic regression model. The logistic regression model outputs a fraud identification result that whether the user to be identified is the middle level fraudulent user or the normal user (the non-fraudulent user).

3. Identification of a High Level Fraudulent User

In a process of implementing the embodiments of this application, the inventor finds that a high level fraudulent user uses (for example, develops) a specific APP to generate false flow. The specific APP does not have a function of providing services (for example, media services or social services) for a user, and uses a program encapsulated in the APP to simulate different users, to click an advertisement in an advertisement position of a specific traffic party, to generate false flow. That is, the specific APP is an APP that is specifically used for generating false flow, and users of the APP are all high level fraudulent users. Once it is identified that an APP is a specific APP used by a high level fraudulent user, all users in the specific APP can be identified as high level fraudulent users.

In addition, in the process of implementing the embodiments of this application, the inventor finds that, in a process of using the specific APP to make advertisement-related fraud by the high level fraudulent user, features of multiple dimensions of the simulated users clicking the advertisement are very approximate, that is, a correlation degree is very high; however, features of different dimensions of normal users (non-fraudulent users) are discrete, that is, a correlation degree is very low.

Therefore, in the embodiments of this application, an APP is used as a unit when a high level fraudulent user is identified, and one-time overall identification is performed to identify a user in the APP is the high level fraudulent user. Similarity degrees that are in multiple dimensions and that are of all users in an APP to be identified are determined. Once the similarity degrees are relatively high, the APP to be identified is identified as the specific APP used by the high level fraudulent user. Correspondingly, all users in the APP to be identified are identified as high level fraudulent user. Descriptions are provided with reference to a flowchart.

Figure 5:
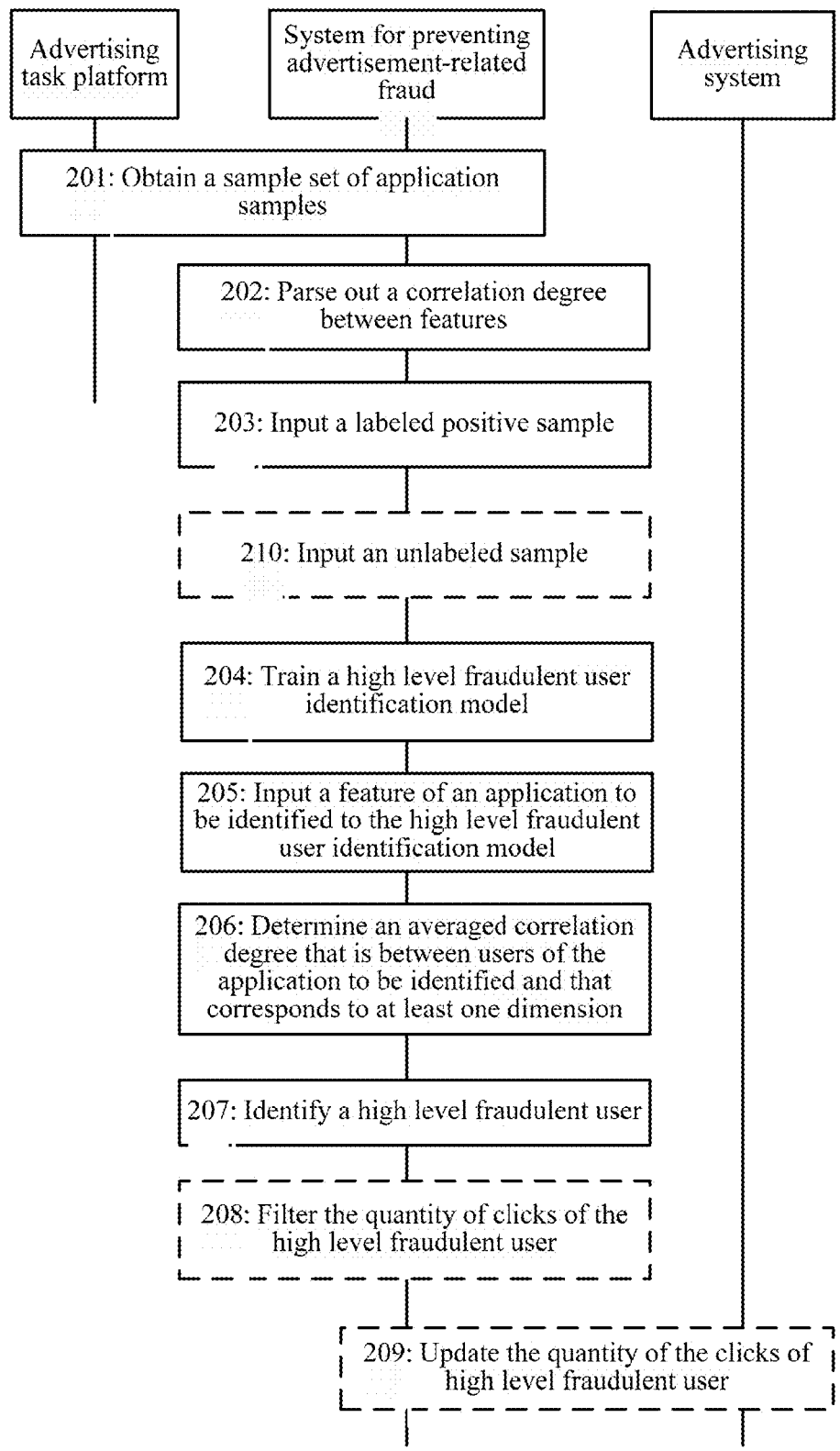
FIG. 5 is a schematic flowchart of identifying a high level fraudulent user according to an embodiment of this application.

Referring to FIG. 5, FIG. 5 is an optional schematic flowchart of identifying a high level fraudulent user according to an embodiment of this application. Each step is described as follows.

In this embodiment of this application, a system for preventing advertisement-related fraud uses a high level fraudulent user identification model to identify a high level fraudulent user. Therefore, the system for preventing advertisement-related fraud needs to form an available sample, to train the high level fraudulent user identification model. As noted, the high level fraudulent user is identified with an APP as a unit (one-time identification is performed to identify whether a user of the APP is a high level fraudulent user). Correspondingly, the system for preventing advertisement-related fraud obtains a sample set including a sample for which the APP is used as the unit (i.e., an APP sample) (step 201). Each APP sample in the sample set corresponds to an APP. Moreover, at least one APP sample corresponds to an APP in which it is known that a high level fraudulent user exists, so that the system for preventing advertisement-related fraud uses the APP sample to form a positive sample for training the high level fraudulent user identification model. In addition, optionally, the sample set may also include an APP sample corresponding to an APP in which it is unknown whether a high level fraudulent user exists, in which the APP sample is referred to as an unlabeled APP sample.

In some embodiments, the APP sample includes various types of information that correspond to the APP. An optional data structure of the APP sample is shown in Table 4:

TABLE 4

|  | A user of the APP | | | |
| --- | --- | --- | --- | --- |
|  | User 1 | User 2 | User 3 | User 4 |
| Sample data of the APP | Click log 1, exposure log 1, . . . | Click log 2, exposure log 2, . . . | Click log 3, exposure log 3, . . . | Click log 4, exposure log 4, . . . |

As shown in Table 4, in an example, each APP sample corresponds to an APP, and includes at least one type of the following information about the corresponding APP.

1) A Click Log of a Click of Each User of the APP on an Advertisement in the APP The click log records information related to operations of clicking the advertisement by each user of the APP. In an example, the click log includes the following information.

1.1) An Advertisement Clicked by the User in an Advertisement Position of the APP in a Statistical Period The advertisement clicked by the user is distinguished by using an identity (ID) assigned by the advertising system side to the advertisement, or is distinguished by using a category label assigned by the advertising system side to the advertisement.

In an example, the advertisement clicked by the user in the statistical period may be a record of advertisements clicked by the user in all advertisement positions of the APP, and is recorded in a form of an advertisement 1, an advertisement 2, and an advertisement 3.

Alternatively, the advertisement clicked by the user in the statistical period may be a record of advertisements clicked by the user in different advertisement positions of the APP, and is recorded in a form of an advertisement position 1—an advertisement 1—an advertisement 2, and the advertisement 2—an advertisement 3—an advertisement 4.

1.2) The Quantity of Clicks of the User on the Advertisement in the Advertisement Position of the APP in the Statistical Period In an example, the quantity of clicks of the user on the advertisement in the advertisement position of the APP in the statistical period is a total quantity of clicks of the user on the advertisement in the advertisement position of the APP in the statistical period.

For example, the user clicks a total of three advertisements in the statistical period (for example, one week), that is, an advertisement 1, an advertisement 2, and an advertisement 3. Quantities of corresponding clicks are respectively 2, 3, and 4. The quantity of clicks of the user in the statistical period is 9 (2+3+4).

In an example, the quantity of clicks of the user on the advertisement in the advertisement position of the APP in the statistical period may alternatively be a total quantity of clicks of the user on a same advertisement in the advertisement position of the APP in the statistical period, or may be a quantity of clicks of the user on a same advertisement in the advertisement position of the APP in each time period (less than the statistical period, for example, one day or one hour) of the statistical period (for example, one week).

For example, the user clicks a total of three advertisements in the advertisement position of the APP in a first time period of the statistical period, that is, the advertisement 1, the advertisement 2, and the advertisement 3. Quantities of the corresponding clicks are 2, 3, and 4. The user clicks a total of three advertisements in the advertisement position of the APP in a second time period of the statistical period, that is, the advertisement 1, the advertisement 2, and the advertisement 3. Quantities of the corresponding clicks are 2, 3, and 4. Quantities of clicks of the user on the advertisement 1, the advertisement 2, and the advertisement 3 in the statistical period are 4 (2+2), 6 (3+3), and 8 (4+4).

1.3) A Time in which the User Clicks the Advertisement in the Advertisement Position of the APP in the Statistical Period In an example, the time in which the user clicks the advertisement in the advertisement position of the APP in the statistical period is a total duration in which the user clicks the advertisement in the advertisement position of the APP in the statistical period.

For example, if the APP has two advertisement positions, that is, an advertisement position 1 and an advertisement position 2, in the statistical period, a duration in which the user clicks the advertisement in the advertisement position 1 is T1, a duration in which the user clicks the advertisement in the advertisement position 2 is T2, and the total duration in which the user clicks the advertisement in the advertisement positions in the statistical period is T1+T2.

Alternatively, the time in which the user clicks the advertisement in the advertisement position of the APP in the statistical period may be a duration in which the user clicks the advertisement in each advertisement position, for example, the duration T1 in which the user clicks the advertisement in the advertisement position 1 and the duration T2 in which the user clicks the advertisement in the advertisement position 2.

1.4) A Type of the Advertisement Position in which the Advertisement is Clicked by the User in the Statistical Period The advertisement position in the APP is used as an example. The types of the advertisement position includes the followings:

An opening-screen advertisement position is a position that is in an interface of the APP and in which the advertisement is displayed to the user after enabling the APP and before content of the APP is uploaded;

An inserting-screen advertisement position is a position in which the advertisement is inserted in the interface of the APP during uploading of the content of the APP.

A banner the advertisement position is a position in which the advertisement is presented on a page on which the user in the APP stays for a relatively long period of time (a stay time exceeding a stay time threshold) or on a page to which the user in the APP frequently accesses, for example, an edge of a page (a top area or a bottom area).

2) An Exposure Log of the Click of Each User of the APP on the Advertisement in the Advertisement Position The exposure log is used for recording an object that is exposed by the advertisement clicked by each user of the APP in the advertisement position, for example, an APP name, a commodity name, or a page address.

3) An Effect Log of the Click of Each User of the APP on the Advertisement in the APP As noted, the effect log includes an advertising effect that is achieved by the object exposed by the advertisement after each user of the APP clicks the advertisement.

For example, the object exposed by the advertisement is the APP. The advertising effect may be one of the followings: starting downloading the APP by the user; completing downloading the APP; installing the APP in a device of the user; activates the APP in the device of the user; or uninstalling the APP in the device of the user by the user.

For another example, the object exposed by the advertisement is a commodity that is sold online. The advertising effect that is recorded in the effect log for the advertisement may be: placing an order for the commodity by the user; paying the order by the user; or canceling the order by the user.

4) Information About a Device Used by Each User of the APP

In an example, the information about the device may be hardware information of the device, for example, a model of the device, remaining space of the device, and remaining battery capacity of the device.

Certainly, software information of the device may be information such as a communications operator used by the device, an operating system (a type and a model) used by the device, and a networking method of the device. In addition, the information of the device may alternatively be information such as a location (for example, latitude and longitude) of the device or a moving speed of the device.

Note that information used in this embodiment of this application and that is included in the APP sample is not limited to the foregoing descriptions. Person of ordinary skills in the art may easily change or extend the information included in the APP sample, thereby implementing information different from the information included in the APP sample, and the description thereof is not provided herein.

Descriptions are provided following the step. After the system for preventing advertisement-related fraud obtains the sample set, for each APP sample, the system for preventing advertisement-related fraud parses out a correlation degree between features that are of at least one dimension and that are any two users in the APP sample (step 202). The dimension used by the feature is selected according to the type of the information included in the APP sample. A correlation degree between features of different dimensions is described below by using an example.

In some embodiments, the following correlation degrees between the features of the dimensions may be used.

1) A Correlation Degree Between Features of Operations of Clicking the Advertisement in the APP by any Two Users in the APP The feature of clicking the advertisement by a user of the APP in the advertisement position may be a position (or a frequency) of the click of the user in the APP, downloads of the APP exposed by the advertisement, a frequency of accessing a page exposed by the advertisement, or the like.

2) A Correlation Degree Between Objects Exposed by the Advertisement Clicked in the APP Sample and by any Two Users in the APP 3) A Correlation Degree Between Information About Devices Used by any Two Users in the APP for Clicking the Advertisement The correlation degree about a device used by a user of the APP may be a correlation degree between a dimension of the device, for example, hardware information, software information, a location of the device or a moving speed of the device.

For example, the correlation degree of the hardware information is a correlation degree between differences of an aspect of the device used by the user, such as remaining space of the device or remaining battery capacity of the device.

4) A Correlation Degree Between Advertising Effects of the Advertisement Clicked by any Two Users in the APP For a sample APP in the sample set, if the sample APP is an APP in which it is known that a high level fraudulent user exists, the similarity degree between any two users in the APP in the dimension is 100%. If the sample APP is an APP in which it is unknown whether a high level fraudulent user exists, the similarity degree between any two users in the APP in the dimension is 0%.

For example, for an APP in which it is known that a high level fraudulent user exists, a combination of any two users in the APP and the similarity degree between the two users are used as a positive sample, and the similarity degree between each two users in the APP is 100%. If four users A, B, C, and D exists in the APP, a total of six positive samples exist, that is, (A and B: 100%; A and C: 100%; A and D: 100%; B and C: 100%; B and D: 100%; and C and D: 100%).

For an APP in which it is unknown whether a high level fraudulent user exists, two users in the APP and the similarity degree between the two users are used as an unlabeled sample, and the similarity degree between the two users in the APP is 0%. If four users A, B, C, and D exists in the APP, a total of six negative samples exist, that is, (A and B: 0%; A and C: 0%; A and D: 0%; B and C: 0%; B and D: 0%; and C and D: 0%).

Descriptions are provided following the step. For each sample APP, after parsing out the correlation degree between any two users of any sample APP in a feature of at least one dimension, the system for preventing advertisement-related fraud labels an APP sample in which it is known a high level fraudulent user exists and the correlation degree that is between any two users of the APP sample and that corresponds to the at least one dimension as a positive sample (step 203), and inputs the positive sample to a fraudulent user identification model to train model parameters of the fraudulent user identification model (step 204).

In an embodiment, the system for preventing advertisement-related fraud further uses any two users in the unlabeled APP sample in the sample set and the similarity degree (0%) between the two users in the dimension to form an unlabeled sample for training the high level fraudulent user identification model, and inputs the unlabeled sample together with the positive sample to the high level fraudulent user identification model (step 210). Based on the high level fraudulent user identification model, the unlabeled sample is selected by means of iteration and labeled as a positive sample, to increase the quantity of positive samples. After the quantity of APP samples that are labeled as positive samples and that are in the sample set is stable (the quantity of positive samples is not increased after multiple iterations), a remaining unlabeled APP sample in the sample set is labeled as a negative sample, in which the correlation degree between any two users in the negative sample is 0%.

The high level fraudulent user identification model may include a series of functions, and intends to form a mapping from an input APP sample to an average correlation degree of the APP sample. An optional example is:

the average correlation degree of the APP sample=$f(c*\text{feature }3+d*\text{feature }4)$, in which the feature 3 and the feature 4 are features of samples (one of the positive sample and one of the negative sample) for training, and model parameters c and d are used for controlling weights of the feature 3 and the feature 4. A training process of the high level fraudulent user identification model is a process in which the model parameters c/d are continuously optimized, so that an output average similarity degree is more accurate. In an actual application, the quantity of model parameters may be 2 or more, and the quantity of used features is not limited.

Descriptions are provided following the step. After training the high level fraudulent user identification model, the system for preventing advertisement-related fraud inputs a feature of the at least one dimension of an APP to be identified to the high level fraudulent user identification model (step 205), obtains a correlation degree that is output by the fraudulent user identification model, that is between users of the APP to be identified, and that corresponds to the at least one dimension, take an average of the correlation degree between any two users in the feature of the at least one dimension, and obtains an average correlation degree that is of the APP sample and that corresponds to the at least one dimension (step 206).

For example, an APP 1 includes a user 1, a user 2, and a user 3. If, in a similarity degree dimension of device information, similarity degrees between any two users are s1, s2, and s3, the average similarity degree of the APP 1 in the similarity degree dimension of device information is (s1+s2+s3)/3.

The high level fraudulent user is identified based on the average correlation degree (step 207): Compare the average correlation degree with a threshold of the average correlation degree; if an output average correlation degree is greater than the threshold of the average correlation degree, it indicates that features of users of the APP to be identified are very approximate; and determine that the APP to be identified is an APP used by the high level fraudulent user for making advertisement-related fraud, in which all users of the APP to be identified are identified as high level fraudulent users, thereby performing efficient determination on whether the users of the APP to be identified are high level fraudulent users.

In some embodiments, after identifying the high level fraudulent user from the sample to be identified, the system for preventing advertisement-related fraud further filters the quantity of clicks of the high level fraudulent user (step 208), and updates the filtered quantity of clicks of the high level fraudulent user to the advertising system (step 209), so that a charging end of the advertising system performs charging for advertisement push by using the updated quantity of clicks in combination with a charging policy. The quantity of clicks of the high level fraudulent user is filtered out the quantity of clicks on the advertisement, thereby ensuring that the quantity of clicks on the advertisement is formed due to normal click operations of the user, ensuring the accuracy and realness of the quantity of clicks on the advertisement, and avoiding a problem that the accuracy of charging data for the advertisement pushed by an advertiser is affected due to the quantity of clicks of the high level fraudulent user.

In an example, the system for preventing advertisement-related fraud has many methods for filtering the quantity of clicks of the high level fraudulent user. For example, the quantity of clicks of the high level fraudulent user is filtered according to a preset ratio. For example, the quantity of clicks of the high level fraudulent user is a, and the preset ratio is 70%, the filtered quantity of clicks of the high level fraudulent user is updated to a*30%. Specially, when the preset ratio is 100%, the quantity of clicks of the high level fraudulent user is zeroed out.

Figure 6:
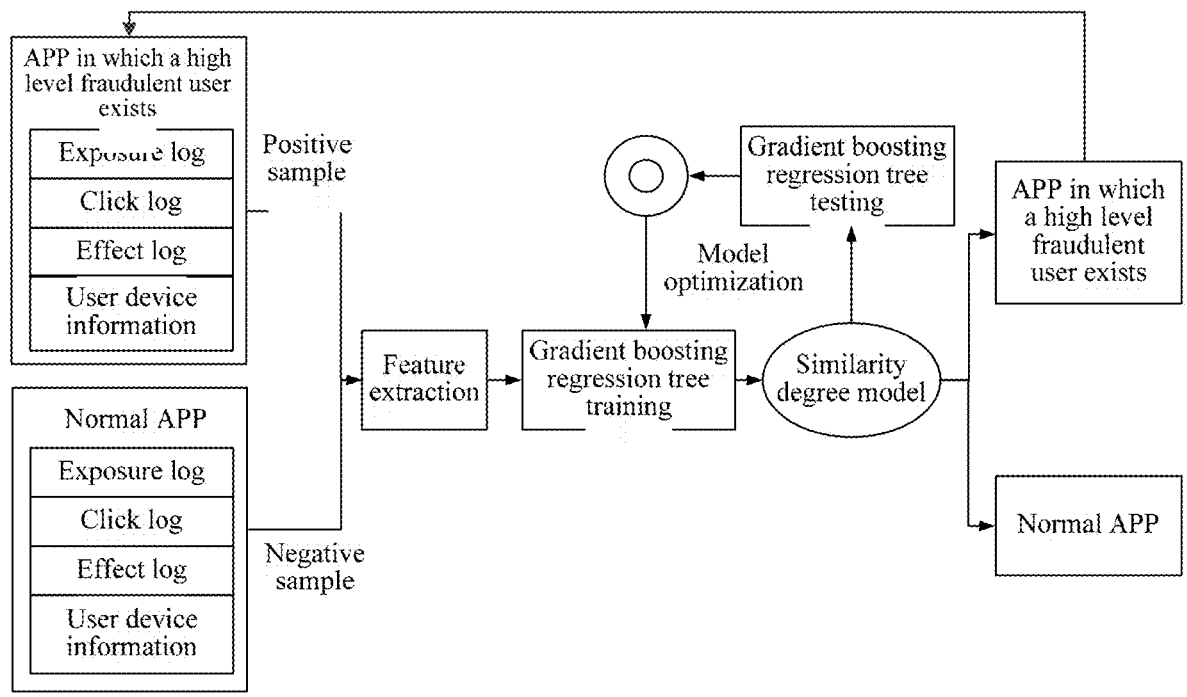
FIG. 6 is a schematic implementation diagram of training a high level fraudulent user identification model and identifying a high level fraudulent user by using the high level fraudulent user identification model according to an embodiment of this application.

Moreover, with reference to FIG. 6, FIG. 6 is an optional schematic implementation diagram of training a high level fraudulent user identification model and identifying a high level fraudulent user by using the high level fraudulent user identification model.

The high level fraudulent user is a user group fabricating a fraudulent APP and use the fraudulent APP to make advertisement-related fraud. The fraudulent APP generally has centrality for the high level fraudulent user. A common APP (for example, a social APP) has no high level fraudulent user, but all users in a fraudulent APP are high level fraudulent users. Because the quantity of clicks of a single fraudulent user is not high, a correlation degree of a fraudulent user group needs to be used for identification. For an APP in which high level fraudulent users exists, a notable feature of the APP is that similarity degrees between features that are of the users in the APP and that are in aspects of device information, exposure, click, and effect are very high. For the characteristic, all device information, exposure logs, click logs, and effect logs of users in an APP to be identified are integrated, to extract features of different dimensions, and calculate similarity degrees between the features of the users. Then, whether a high level fraudulent user group exists in the APP is determined according to an average similarity degree of users in the APP and a preset average similarity degree threshold. The preset average similarity degree may be an average of similarity degrees between features of users of a common APP.

When a similarity degree between any two users is calculated, the following features are used:

features related to device information: features such as a similarity degree between device models of the two users, a difference between remaining space of devices, a similarity degree between longitudes and latitudes, a similarity degree of operators, and a similarity degree between networking methods; and features related to exposure, clicks, and effects: features such as a similarity degree between APPs exposed by the two users, a difference between exposure times, a similarity degree between clicks on the APPs, a difference between quantities of clicks, a similarity degree between click coordinates, a similarity degree between downloaded APPs, and a difference between downloads.

Based on the features, a gradient boosting regression tree model is trained, to calculate an average similarity of users of the APP to be identified in at least one dimension.

A positive sample for initial training of the gradient boosting regression tree model is from data (including an exposure log, a click log, an effect log, and user device information) of an APP in which it is known that high level fraudulent users exist and that is in the sample set of the APP sample, and an unlabeled sample for the initial training is from remaining APPs in the sample set of the APP sample. The quantity of positive samples is continuously increased by means of positive-unlabeled learning. After a training result is stable, that is, after the quantity of positive samples in the sample set is stable, remaining unlabeled samples in the sample set are used as negative samples. The gradient boosting regression tree model is trained by using the positive samples and the negative samples.

The model that is obtained after the training is used for the similarity degrees between users of the APP to be identified, and determines, according to the average similarity degree between users of the APP to be identified, whether the high level fraudulent user group exists in the APP to be identified. An identification result of the APP to be identified may be updated to the sample set, to continuously accumulate samples, so that the gradient boosting regression tree model is automatically corrected.

Figure 7:
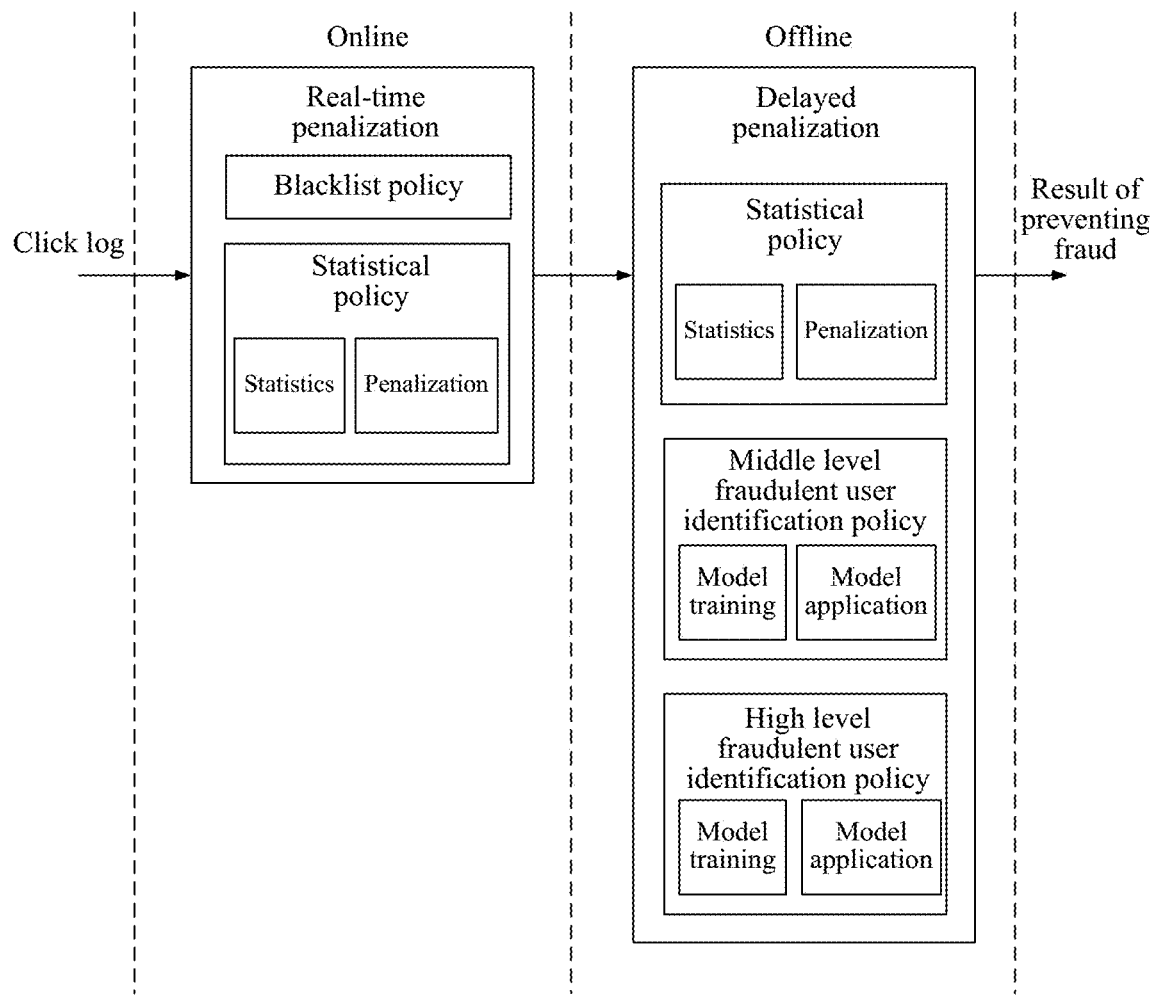
FIG. 7 is a schematic diagram of identifying a fraudulent user by a system for preventing advertisement-related fraud according to an embodiment of this application.

In some embodiments, considering that an apparatus for preventing advertisement-related fraud needs to perform comprehensive identification on different levels of fraudulent users, correspondingly, referring to FIG. 7, FIG. 7 is an optional schematic flowchart of identifying a fraudulent user by a system for preventing advertisement-related fraud, mainly including two processes:

1) Online Real-Time Penalization is to Filter Clicks of a User on a Blacklist According to a Blacklist Policy.

Maintain a blacklist including a low level fraudulent user in advance, where the blacklist includes an identifier of a low level fraudulent user. An identifier of a user currently clicking an advertisement is extracted from a click log obtained from an advertising system, and the identifier is matched with the identifier of the low level fraudulent user in the blacklist. Once the matching succeeds, it is determined that the user currently clicking the advertisement is a low level fraudulent user, and the quantity of clicks of the low level fraudulent user is filtered.

2) Offline Delayed Repenalization 2.1) As noted in the first part, the system for preventing advertisement-related fraud uses a statistical policy to filter the quantity of clicks that is in the quantity of clicks of the low level fraudulent user and that does not exceed a threshold for the quantity of clicks.

2.2) As noted in the second part, the system for preventing advertisement-related fraud uses a middle level fraudulent user identification policy to identify a middle level fraudulent user, and filters the quantity of clicks of the middle level fraudulent user.

2.3) As noted in the third part, the system for preventing advertisement-related fraud uses a high level fraudulent user identification policy to identify a high level fraudulent user, and filters the quantity of clicks of the high level fraudulent user.

It may be learned from FIG. 7 that, according to different fraudulent means and abnormal behaviors of fraudulent users, the system for preventing advertisement-related fraud divides the fraudulent users into three levels, that is, a low level fraudulent user, a middle level fraudulent user, and a high level fraudulent user, and uses a method corresponding to each level of the fraudulent users for identification, thereby performing multi-level identification on the fraudulent users. Meanwhile, for the quantity of clicks of an identified fraudulent user on an advertisement, the quantity of clicks on the advertisement is filtered, thereby improving reliability of statistical advertising effects.

Figure 8:
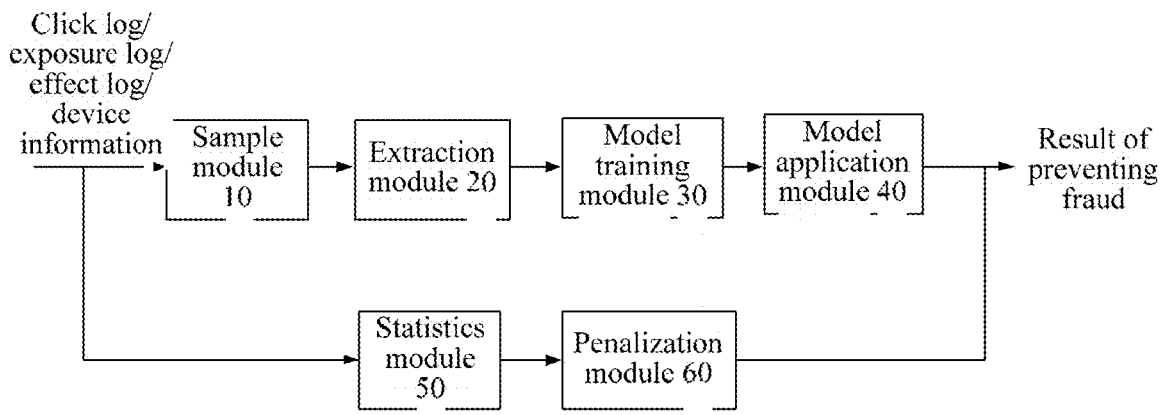
FIG. 8 is a schematic diagram of a functional architecture of a system for preventing advertisement-related fraud according to an embodiment of this application.

The apparatus for preventing advertisement-related fraud provided in the embodiments of this application may be independently implemented in a server, or may be dispersedly implemented in a server cluster in a form of the system for preventing advertisement-related fraud. An optional schematic diagram of a functional architecture of the system for preventing advertisement-related fraud is shown in FIG. 8. The system includes a sample module 10, an extraction module 20, a model training module 30, a model application module 40, a statistics module 50, and a penalization module 60.

Figure 9:
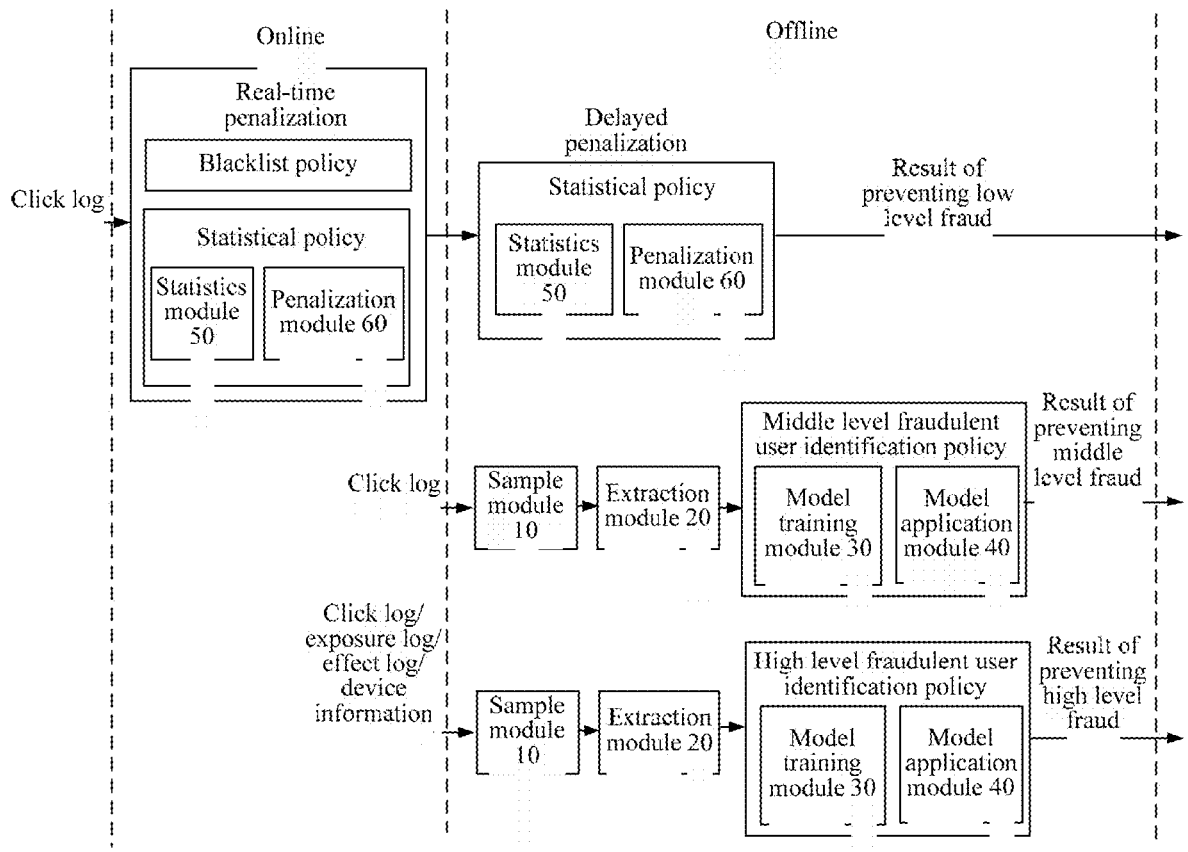
FIG. 9 is a schematic diagram of identifying a fraudulent user by a system for preventing advertisement-related fraud according to an embodiment of this application.

Descriptions are provided with reference to a schematic diagram of leveled identification of a fraudulent user by the system for preventing advertisement-related fraud that is shown in FIG. 9.

1. Identification of a Low Level Fraudulent User

1) Online Real-Time Penalization 1.1) Blacklist Policy

The statistics module 50 maintains a blacklist including a low level fraudulent user in advance, where the blacklist includes an identifier of a low level fraudulent user; extracts an identifier of a user currently clicking an advertisement from a click log obtained from an advertising system, and matches the identifier with the identifier of the low level fraudulent user in the blacklist; and once the matching succeeds, determines that the user currently clicking the advertisement is a low level fraudulent user (a low level fraud result).

1.2) Statistical Strategy

The statistics module 50 collects statistics on the click log obtained from the advertising system, and when the quantity of clicks of the user on the advertisement exceeds a threshold for the quantity of clicks according to the statistics, identifies the user as a low level fraudulent user.

The penalization module 60 filters the quantity of clicks of the fraudulent user and feeds back the filtering result to the advertising system. In an example, the quantity of clicks exceeding the threshold for the quantity of clicks is filtered according to a preset ratio. A higher quantity of clicks exceeding the threshold for the quantity of clicks indicates a higher filtering ratio.

2) Offline Delayed Repenalization

The penalization module 60 uses the preset ratio to filter the quantity of clicks that is in the quantity of clicks of the fraudulent user and that does not exceed the threshold for the quantity of clicks, or filters the quantity of clicks completely, that is, the quantity of clicks of the low level fraudulent user is zeroed out. The preset ratio used in the offline delayed repenalization is usually greater than a preset ratio used in the statistical policy, so that the quantity of clicks that is in the quantity of clicks of the low level fraudulent user and that does not exceed the threshold for the quantity of clicks (a probability that the quantity of clicks is maliciously triggered is higher than a probability that the quantity of clicks exceeding the threshold for the quantity of clicks) is filtered to a higher degree.

2. Identification of a Middle Level Fraudulent User

The sample module 10 obtains a sample set, where at least one sample in the sample set including a fraudulent user and a click log of a click of the fraudulent user on an advertisement.

The extraction module 20 extracts, from samples in the sample set, a feature of at least one dimension corresponding to a level of the fraudulent user, where each fraudulent user corresponds to a level, and features corresponding to different levels of fraudulent users are different.

The module training module 30 and the module application module 40 jointly implements a middle level fraudulent user identification policy.

The module training module 30 labels the fraudulent user and the click log of the click of the fraudulent user on the advertisement as a positive sample in a feature of at least one dimension, and trains a fraudulent user identification model corresponding to the level of the fraudulent user based on at least the positive sample.

The module application module 40 determines that a sample to be identified corresponds to the feature of the at least one dimension; and inputs the feature of the at least one dimension corresponding to the sample to be identified to the trained fraudulent user identification model, to identify a fraudulent user in the sample to be identified (a result of preventing middle level fraud).

The extraction module 20 parse the click log in the sample set, and correspondingly obtains a feature related to an operation of the click on the advertisement.

The feature related to the operation of the click on the advertisement includes a feature of the following dimensions:

the quantity of clicks in a statistical period;

the quantity of time periods that are in the statistical period and in which the advertisement is clicked;

an average of interval time between clicks on the advertisement in the statistical period;

a historical ratio of identified fraudulent users in the statistical period; and an average quantity of clicks on the advertisement in time periods that are in the statistical period and in which the advertisement is clicked.

The module training module 30 performs training in the following manner: inputting the positive sample to the fraudulent user identification model, to train model parameters in the fraudulent user identification model; and testing the precision of identifying the fraudulent user by the fraudulent user identification model, and when the identification precision does not reach a preset precision, adjusting and processing the model parameters until the precision of the fraudulent user identification model reaches the preset precision, where the click log of the fraudulent user is a click log that corresponds to the fraudulent user implementing an advertising task of an advertising task platform.

The module training module 30 may alternatively perform training by using a negative sample in combination with the positive sample: label a non-fraudulent user and a click log of a click of the non-fraudulent user on the advertisement as a negative sample corresponding to the feature of the at least one dimension; and input the negative sample together with the positive sample to the fraudulent user identification model, to train model parameters in the fraudulent user identification model, where at least one sample in the sample set includes the non-fraudulent user and the click log of the click of the non-fraudulent user on the advertisement, and the click log of the non-fraudulent user is a click log corresponding to the non-fraudulent user clicking the advertisement in an APP.

3. Identification of a High Level Fraudulent User

The samples in the sample set formed by the sample module 10 are APP samples corresponding to different APPs, where at least one of the APP samples is an APP in which is known a high level fraudulent user exists, and each of the APP samples includes at least one piece of information of the following dimensions of the corresponding APP:

a click log of a click of a user of the APP on an advertisement in the APP;

an exposure log of a click of a user of the APP on an advertisement in the APP;

an effect log of a click of a user of the APP on an advertisement in the APP; or information about a device used by a user of the APP.

The extraction module 20 parses a correlation degree that corresponds to at least one dimension and that is between any two users of the APP sample; and determines an average correlation degree of the APP sample corresponding to the at least one dimension, where the average correlation degree corresponding to the at least one dimension is an average of correlation degrees between features of the corresponding dimension of any two users of the APP sample.

The model training module 30 labels the APP sample in which it is known that a high level fraudulent user exists and the average correlation degree of the APP sample corresponding to the at least one dimension as a positive sample; and inputs the positive sample to a fraudulent user identification model, to train model parameters of the fraudulent user identification model.

The module training module 30 labels an unlabeled APP sample (an APP sample that is in the sample set and in which it is unknown whether high level fraudulent user exists) in the sample set and an average correlation degree of the APP sample corresponding to the at least one dimension as an unlabeled APP sample; labels the correlation degree that corresponds to the at least one dimension and that is between any two users of the unlabeled APP sample as an unlabeled sample; and inputs the unlabeled sample together with the positive sample to the fraudulent user identification model, to train the model parameters of the fraudulent user identification model until the quantity of unlabeled samples that are input to the fraudulent user identification model and that are labeled as positive samples by the fraudulent user identification model is in a stable state.

The module application module 40 obtains a correlation degree corresponding to the at least one dimension that is output by the fraudulent user identification model and that is between any two user of an APP to be identified, determines an average correlation degree corresponding to the at least one dimension that is between users of the APP to be identified; and when the average correlation degree exceeds an average correlation degree threshold, determines that the users of the APP to be identified are high level fraudulent users (a result of identifying high level fraud).

In conclusion, the embodiments of this application have the following beneficial effects:

1) A middle level fraudulent user is identified offline by means of delayed processing, that is, the middle level fraudulent user is identified offline by using a logistic regression model, and the quantity of clicks of the middle level fraudulent user is filtered, to ensure the accuracy of the quantity of clicks on a statistical advertisement.

2) A high level fraudulent user is identified offline by means of delayed processing, that is, the high level fraudulent user is identified offline by using a gradient boosting regression tree model, and the quantity of clicks of the high level fraudulent user is filtered, to ensure the accuracy of the quantity of clicks on a statistical advertisement.

3) The manner of online real-time penalization can be used to identify a the low level fraudulent user in real time, and filter the quantity of clicks of the low level fraudulent user in real time, thereby ensuring that the quantity of clicks of the low level fraudulent user is effectively filtered when the quantity of clicks on the advertisement needs to be obtained in real time.

4) The offline delayed repenalization can cover identification of each level fraudulent user, thereby ensuring comprehensive filtering of clicks of the fraudulent users.

Figure 10:
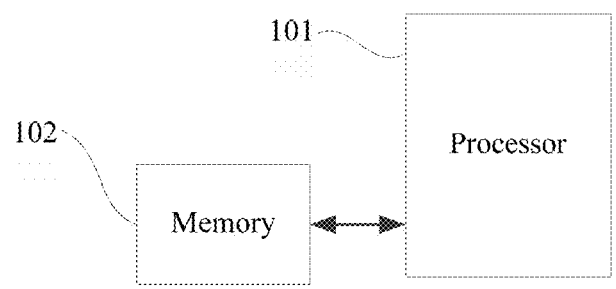
FIG. 10 is a schematic structural diagram of a system for preventing advertisement-related fraud according to an embodiment of this application.

As shown in FIG. 10, FIG. 10 is a schematic structural diagram of a system for preventing advertisement-related fraud according to an embodiment of this application. The system for preventing advertisement-related fraud may include a processor 101 including one or more processing cores and a memory 102 including one or more computer readable storage medium. The structure of the system for preventing advertisement-related fraud shown in FIG. 10 does not construct limitation to the system for preventing advertisement-related fraud. The system may include more of fewer components shown in the figure, or components may be combined, or a different component deployment may be used.

The processor 101 is a control center of the system for preventing advertisement-related fraud, and implements various functions of the system for preventing advertisement-related fraud and processes data by running or executing a software program and/or module stored in the memory 102 and invoking data stored in the memory 102, thereby monitoring the entire system for preventing advertisement-related fraud. Optionally, the processor 101 may include one or more processing cores. In an example, the processor 101 may integrate an application processor and a modem processor. The application processor mainly processes an operating system, a user interface, an application program, and the like. The modem processor mainly processes wireless communication. It may be understood that the foregoing modem processor may alternatively not be integrated into the processor 101.

The memory 102 may be configured to store the software program and module. The processor 101 runs the software program and module stored in the memory 102, to implement various functional applications and data processing. The memory 102 may mainly include a program storage area and a data storage area. The program storage area may store an operating system, an application program used by at least one function (such as a sound playing function and an image playback function), and the like. The data storage area may store data created according to use of the server, and the like. In addition, the memory 102 may include a high speed random access memory, and may further include a non-volatile memory, such as at least one magnetic disk storage device, a flash memory, or another volatile solid-state storage device. Correspondingly, the memory 102 may further include a memory controller, to provide access of the processor 101 to the memory 102.

Although not shown in the figure, the system for preventing advertisement-related fraud may further include an input apparatus, an RF circuit, a power supply, a display unit, a camera, a Bluetooth module, and the like, which are not further described herein. Specifically, in this embodiment, the processor 101 of the system for preventing advertisement-related fraud may load, according to the following instructions, executable files corresponding to processes of one or more application programs into the memory 102. The processor 101 runs the application programs stored in the memory 102, to implement various functions:

obtaining a sample set, at least one sample in the sample set including a fraudulent user and a click log of a click of the fraudulent user on an advertisement;

extracting, from samples in the sample set, a feature of at least one dimension corresponding to a level of the fraudulent user, each fraudulent user corresponding to a level, and features corresponding to different levels of fraudulent users being different;

forming, based on the fraudulent user and the click log of the click of the fraudulent user on the advertisement, a positive sample corresponding to the feature of the at least one dimension, and training, based on at least the positive sample, a fraudulent user identification model corresponding to the level of the fraudulent user;

determining that a sample to be identified corresponds to the feature of the at least one dimension; and inputting, to the trained fraudulent user identification model, the feature of the at least one dimension corresponding to the sample to be identified, and identifying, based on an output result, a fraudulent user in the sample to be identified.

Refer to the foregoing embodiments for an implementation method of each operation, and details are not described herein again.

In the embodiments of this application, if implemented in the form of software functional modules and sold or used as independent products, the integrated modules may alternatively be stored in a computer-readable storage medium. Based on such an understanding, persons skilled in the art should understand that the embodiments of this application may be provided as methods, systems, or computer program products. Therefore, this application may take the form of total hardware embodiments, total software embodiments, or embodiments combining software and hardware. In addition, this application may use a form of a computer program product implemented on one or more computer available storage media including computer available program code. The storage media include, but are not limited to a U disk, a mobile hard disk, a read-only memory (ROM), a random access memory (RAM), a disk memory, a compact disc read-only memory (CD-ROM), an optical memory, and the like.

This application is described with reference to flowcharts and/or block diagrams of the method, the device (the system), and the computer program product in the embodiments of this application. Computer program instructions can be used for implementing a process and/or a block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may further be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may further be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although the embodiments of this application have been described, other changes and modifications can be made to these embodiments. Therefore, the following claims are intended to cover the embodiments and all changes and modifications falling within the scope of this application.

The foregoing descriptions are merely exemplary implementation manners of this application, but are not intended to limit the protection scope of this application. Any variation or replacement readily figured out by persons skilled in the art within the technical scope disclosed in this application shall fall within the protection scope of this application. Therefore, the protection scope of the present application shall be subject to the protection scope of the claims.

What is claimed is:

1. A method, comprising:
obtaining a training sample set including multiple training samples, at least one of the multiple training samples being associated with a fraudulent training user and including a training click log associated with clicking one or more advertisements by the fraudulent training user;
extracting feature information from the training sample set, the fraudulent training user and the feature information being associated with a fraudulent user type of a plurality of fraudulent user types;
forming, based on the at least one of the multiple training samples, a positive sample associated with the feature information;
training, based on at least the positive sample, a fraudulent user identification model associated with the fraudulent user type;
receiving a sample to be identified, the sample being associated with a user to be identified; and
determining, by using the fraudulent user identification model associated with the fraudulent user type, whether the user to be identified is a fraudulent user based on the sample to be identified by:
determining an identifier of the user to be identified matches a preset identifier of the fraudulent user type, or
determining a number of clicks of the clicking the one or more advertisements in a statistical period exceeds a clicking threshold.

2. The method according to claim 1, wherein the extracting the feature information from the training sample set further comprises:
extracting operating data corresponding to the clicking the one or more advertisements in the training click log; and
parsing out the operating data to obtain the feature information associated with the clicking the one or more advertisements, the feature information including at least one of:
a number of clicks in a statistical period;
a number of time periods, in the statistical period, when the one or more advertisements is clicked;
an average time interval of one or more time intervals, each of the one or more time intervals being a temporal duration between adjacent clicks of the clicking the one or more advertisements in the statistical period;
a historical ratio of one or more fraudulent training users in the statistical period, the one or more fraudulent training users including the fraudulent training user; and
an average number of clicks of the clicking the one or more advertisements in the time periods in the statistical period.

3. The method according to claim 1, when the user to be identified is the fraudulent user, further comprising:
obtaining a number of clicks of clicking advertisements by the user in a statistical period based on the sample to be identified;
filtering a first number of clicks that is a difference between the number of clicks and a clicking threshold according to a first filtering method and/or filtering the number of clicks according to a second filtering method; and
updating a current number of clicks associated with the user.

4. A method, comprising:
obtaining a training sample set including multiple training samples, at least one of the multiple training samples being associated with a fraudulent training user and including a training click log associated with clicking one or more advertisements by the fraudulent training user;
extracting feature information from the training sample set, the fraudulent training user and the feature information being associated with a fraudulent user type of a plurality of fraudulent user types;
forming, based on the at least one of the multiple training samples, a positive sample associated with the feature information;
training, based on at least the positive sample, a fraudulent user identification model associated with the fraudulent user type;
receiving a sample to be identified, the sample being associated with a user to be identified; and
determining, by using the fraudulent user identification model associated with the fraudulent user type, whether the user to be identified is a fraudulent user based on the sample to be identified,
wherein the multiple training samples in the training sample set are associated with respective training applications (APPs);
the at least one of the multiple training samples is associated with a training APP that is known to be used by the fraudulent training user of the fraudulent type, the training APP being one of the respective training APPs, the fraudulent type being associated with the training APP;
the at least one of the multiple training samples includes at least one of:
the training click log;
a training exposure log that includes one or more objects exposed by the clicking the one or more advertisements by the fraudulent training user;
a training effect log that includes advertisement effects after the clicking the one or more advertisements by the fraudulent training user; and
training device information of a training device used by the fraudulent training user; and
the extracting the feature information from the training sample set includes:
extracting, from the at least one of the multiple training samples, the feature information associated with the fraudulent type, including:
parsing out training users associated with the at least one of the multiple training samples, the training users including the fraudulent training user; and
parsing out a degree of correlation between two of the training users, the degree of correlation being associated with at least one of:
a characteristic of the clicking the one or more advertisements by the two of the training users;
objects exposed by the clicking the one or more advertisements by the two of the training users;
device information associated with devices used by the two of the training users; and
advertising effects after the clicking the one or more advertisements by the two of the training users.

5. The method according to claim 4, wherein
the forming the positive sample associated with the feature information includes labeling the degree of correlation between the two of the training users as the positive sample, the positive sample being associated with the two of the training users; and
the training the fraudulent user identification model includes
inputting the positive sample to the fraudulent user identification model associated with the fraudulent type; and
training, based on at least the positive sample, model parameters in the fraudulent user identification model associated with the fraudulent type.

6. The method according to claim 5, wherein the training, based on at least the positive sample, the model parameters in the fraudulent user identification model further comprises:
labeling a subset of the multiple training samples in the training sample set as initial unlabeled samples, when whether the subset of the multiple training samples is associated with the fraudulent type is unknown, one of the initial unlabeled samples including a degree of correlation that is associated with unlabeled feature information and is between two unlabeled users associated with the one of the initial unlabeled samples;
inputting the initial unlabeled samples into the fraudulent user identification model associated with the fraudulent type;
training, based on the positive sample and the initial unlabeled samples, the fraudulent user identification model associated with the fraudulent type;
labeling, based on output results from the fraudulent user identification model associated with the fraudulent type, a group of the initial unlabeled samples to be additional positive samples and a remaining group of the initial unlabeled samples to be negative samples when a number of the group of the initial unlabeled samples corresponds to a steady state; and
training, based on the positive sample, the additional positive samples, and the negative samples, the model parameters in the fraudulent user identification model associated with the fraudulent type.

7. The method according to claim 4, wherein the determining whether the user to be identified is the fraudulent user further comprises:
inputting the feature information associated with an APP to be identified into the fraudulent user identification model associated with the fraudulent type, the APP to be identified being associated with the sample to be identified;
obtaining, from an output by the fraudulent user identification model associated with the fraudulent type, one or more degrees of correlation between one or more pairs of users to be identified and are associated with the APP to be identified, the one or more degrees of correlation being associated with the feature information, the one or more pairs of users to be identified including the user to be identified;
determining an average degree of correlation associated with the APP to be identified based on the one or more degrees of correlation; and
determining, when the average degree of correlation exceeds a threshold, that the user to be identified is the fraudulent user of the fraudulent type.

8. A method, comprising:
obtaining a training sample set including multiple training samples, at least one of the multiple training samples being associated with a fraudulent training user and including a training click log associated with clicking one or more advertisements by the fraudulent training user;
extracting feature information from the training sample set, the fraudulent training user and the feature information being associated with a fraudulent user type of a plurality of fraudulent user types;
forming, based on the at least one of the multiple training samples, a positive sample associated with the feature information;
training, based on at least the positive sample, a fraudulent user identification model associated with the fraudulent user type;
receiving a sample to be identified, the sample being associated with a user to be identified; and
determining, by using the fraudulent user identification model associated with the fraudulent user type, whether the user to be identified is a fraudulent user based on the sample to be identified,
wherein the training the fraudulent user identification model associated with the fraudulent user type comprises:
inputting the positive sample to the fraudulent user identification model associated with the fraudulent user type;
training, based on at least the positive sample, model parameters in the fraudulent user identification model associated with the fraudulent type;
determining a level of accuracy in identifying a current fraudulent user by the fraudulent user identification model associated with the fraudulent type; and
adjusting the model parameters until the level of accuracy reaches a preset level of accuracy.

9. The method according to claim 8, wherein
the multiple training samples in the training sample set further include at least another of the multiple training samples being associated with a non-fraudulent user and including a non-fraudulent training click log associated with clicking one or more advertisements by the non-fraudulent user; and
the method further includes:
extracting non-fraudulent feature information associated with the non-fraudulent training click log;
labeling the non-fraudulent feature information as a negative sample associated with the non-fraudulent user;
inputting the negative sample and the positive sample to the fraudulent user identification model associated with the fraudulent type; and
training, based on the positive sample and the negative sample, the model parameters in the fraudulent user identification model associated with the fraudulent type.

10. An apparatus, comprising:
interface circuitry configured to:
obtain a training sample set including multiple training samples, at least one of the multiple training samples being associated with a fraudulent training user and including a training click log associated with clicking one or more advertisements by the fraudulent training user; and
receive a sample to be identified, the sample being associated with a user to be identified; and
processing circuitry configured to:
extract feature information from the training sample set, the fraudulent training user and the feature information being associated with a fraudulent user type of a plurality of fraudulent user types;
form, based on the at least one of the multiple training samples, a positive sample associated with the feature information;
train, based on at least the positive sample, a fraudulent user identification model associated with the fraudulent user type; and
determine, by using the fraudulent user identification model associated with the fraudulent user type, whether the user to be identified is a fraudulent user based on the sample to be identified by:
  determining an identifier of the user to be identified matches a preset identifier of the fraudulent user type, or
  determining a number of clicks of the clicking the one or more advertisements in a statistical period exceeds a clicking threshold.

11. The apparatus according to claim 10, wherein the processing circuitry is configured to:
extract operating data corresponding to the clicking the one or more advertisements in the training click log; and
parse out the operating data to obtain the feature information associated with the clicking the one or more advertisements, the feature information including at least one of:
a number of clicks in a statistical period;
a number of time periods, in the statistical period, when the one or more advertisements is clicked;
an average time interval of one or more time intervals, each of the one or more time intervals being a temporal duration between adjacent clicks of the clicking the one or more advertisements in the statistical period;
a historical ratio of one or more fraudulent training users in the statistical period, the one or more fraudulent training users including the fraudulent training user; and
an average number of clicks of the clicking the one or more advertisements in the time periods in the statistical period.

12. The apparatus according to claim 10, wherein the processing circuitry is configured to:
input the positive sample to the fraudulent user identification model associated with the fraudulent user type, the fraudulent user type being a second fraudulent type;
train, based on at least the positive sample, second model parameters in the fraudulent user identification model associated with the second fraudulent type;
determine a level of accuracy in identifying a current fraudulent user by the fraudulent user identification model associated with the second fraudulent type; and
adjust the second model parameters until the level of accuracy reaches a preset level of accuracy.

13. The apparatus according to claim 12, wherein
the multiple training samples in the training sample set further include at least another of the multiple training samples being associated with a non-fraudulent user and including a non-fraudulent training click log associated with clicking one or more advertisements by the non-fraudulent user; and
the processing circuitry is further configured to:
extract non-fraudulent feature information associated with the non-fraudulent training click log;
label the non-fraudulent feature information as a negative sample associated with the non-fraudulent user;
input the negative sample and the positive sample to the fraudulent user identification model associated with the second fraudulent type; and
train, based on the positive sample and the negative sample, the second model parameters in the fraudulent user identification model associated with the second fraudulent type.

14. The apparatus according to claim 10, wherein the processing circuitry is further configured to:
when the user to be identified is determined to be the fraudulent user,
obtain a number of clicks of clicking advertisements by the user in a statistical period based on the sample to be identified;
filter a first number of clicks that is a difference between the number of clicks and a clicking threshold according to a first filtering method and/or filtering the number of clicks according to a second filtering method; and
update a current number of clicks associated with the user.

15. An apparatus, comprising:
interface circuitry configured to:
obtain a training sample set including multiple training samples, at least one of the multiple training samples being associated with a fraudulent training user and including a training click log associated with clicking one or more advertisements by the fraudulent training user; and
receive a sample to be identified, the sample being associated with a user to be identified; and
processing circuitry configured to:
extract feature information from the training sample set, the fraudulent training user and the feature information being associated with a fraudulent user type of a plurality of fraudulent user types;
form, based on the at least one of the multiple training samples, a positive sample associated with the feature information,
train, based on at least the positive sample, a fraudulent user identification model associated with the fraudulent user type; and
determine, by using the fraudulent user identification model associated with the fraudulent user type, whether the user to be identified is a fraudulent user based on the sample to be identified,
wherein
the multiple training samples in the training sample set are associated with respective training applications (APPs);
the at least one of the multiple training samples is associated with a training APP that is known to be used by the fraudulent training user of the fraudulent type, the training APP being one of the respective training APPs, the fraudulent type being associated with the training APP;
the at least one of the multiple training samples includes at least one of:
the training click log;
a training exposure log that includes one or more objects exposed by the clicking the one or more advertisements by the fraudulent training user;
a training effect log that includes advertisement effects after the clicking the one or more advertisements by the fraudulent training user; and
training device information of a training device used by the fraudulent training user; and
the processing circuitry is further configured to:

parse out training users associated with the at least one of the multiple training samples, the training users including the fraudulent training user; and parse out a degree of correlation between two of the training users, the degree of correlation being associated with at least one of:

a characteristic of the clicking the one or more advertisements by the two of the training users;

objects exposed by the clicking the one or more advertisements by the two of the training users;

device information associated with devices used by the two of the training users; and advertising effects after the clicking the one or more advertisements by the two of the training users.

16. The apparatus according to claim 15, wherein the processing circuitry is further configured to:

label the degree of correlation between the two of the training users as the positive sample, the positive sample being associated with the two of the training users;

input the positive sample to the fraudulent user identification model associated with the fraudulent type; and train, based on at least the positive sample, model parameters in the fraudulent user identification model associated with the fraudulent type.

17. The apparatus according to claim 16, wherein the processing circuitry is further configured to:

label a subset of the multiple training samples in the training sample set as initial unlabeled samples, when whether the subset of the multiple training samples is associated with the fraudulent type is unknown, one of the initial unlabeled samples including a degree of correlation that is associated with unlabeled feature information and is between two unlabeled users associated with the one of the initial unlabeled samples;

input the initial unlabeled samples into the fraudulent user identification model associated with the fraudulent type;

train, based on the positive sample and the initial unlabeled samples, the fraudulent user identification model associated with the fraudulent type;

label, based on output results from the fraudulent user identification model associated with the fraudulent type, a group of the initial unlabeled samples to be additional positive samples and a remaining group of the initial unlabeled samples to be negative samples when a number of the group of the initial unlabeled samples corresponds to a steady state; and train, based on the positive sample, the additional positive samples, and the negative samples, the model parameters in the fraudulent user identification model associated with the fraudulent type.

18. The apparatus according to claim 15, wherein the processing circuitry is further configured to:

input the feature information associated with an APP to be identified into the fraudulent user identification model associated with the fraudulent type, the APP to be identified being associated with the sample to be identified;

obtain, from an output by the fraudulent user identification model associated with the fraudulent type, one or more degrees of correlation between one or more pairs of users to be identified and are associated with the APP to be identified, the one or more degrees of correlation being associated with the feature information, the one or more pairs of users to be identified including the user to be identified;

determine an average degree of correlation associated with the APP to be identified based on the one or more degrees of correlation; and determine, when the average degree of correlation exceeds a threshold, that the user to be identified is the fraudulent user of the fraudulent type.

19. A non-transitory computer-readable storage medium storing a program executable by a processor to perform:

obtaining a training sample set including multiple training samples, at least one of the multiple training samples being associated with a fraudulent training user and including a training click log associated with clicking one or more advertisements by the fraudulent training user;

extracting feature information from the training sample set, the fraudulent training user and the feature information being associated with a fraudulent user type of a plurality of fraudulent user types;

forming, based on the at least one of the multiple training samples, a positive sample associated with the feature information;

training, based on at least the positive sample, a fraudulent user identification model associated with the fraudulent user type;

receiving a sample to be identified, the sample being associated with a user to be identified; and determining, by using the fraudulent user identification model associated with the fraudulent user type, whether the user to be identified is a fraudulent user based on the sample to be identified by:

determining an identifier of the user to be identified matches a preset identifier of the fraudulent user type, or determining a number of clicks of the clicking the one or more advertisements in a statistical period exceeds a clicking threshold.

* * * * *